United States Patent
Pawluczyk et al.

(10) Patent No.: US 9,546,904 B2
(45) Date of Patent: Jan. 17, 2017

(54) APPARATUS AND METHOD FOR OPTIMIZING DATA CAPTURE AND DATA CORRECTION FOR SPECTROSCOPIC ANALYSIS

(71) Applicant: P & P OPTICA, INC., Waterloo, Ontario (CA)

(72) Inventors: Olga Pawluczyk, Waterloo (CA); Romuald Pawluczyk, Conestogo (CA); Michael Pretti, Waterloo (CA)

(73) Assignee: P & P OPTICA INC. (CA)

( * ) Notice: Subject to any disclaimer, the term of this patent is extended or adjusted under 35 U.S.C. 154(b) by 12 days.

(21) Appl. No.: 13/842,628

(22) Filed: Mar. 15, 2013

(65) Prior Publication Data
US 2014/0268136 A1   Sep. 18, 2014

(51) Int. Cl.
*G01J 3/28* (2006.01)
*H04N 5/367* (2011.01)
*G01J 3/02* (2006.01)

(52) U.S. Cl.
CPC ............ *G01J 3/28* (2013.01); *G01J 3/027* (2013.01); *H04N 5/367* (2013.01)

(58) Field of Classification Search
USPC ................................................ 356/326, 328
See application file for complete search history.

(56) References Cited

U.S. PATENT DOCUMENTS

| | | | |
|---|---|---|---|
| 4,798,464 A * | 1/1989 | Boostrom | 356/328 |
| 4,892,405 A | 1/1990 | Sorensen et al. | |
| 4,927,269 A | 5/1990 | Keens et al. | |
| 6,266,140 B1 | 7/2001 | Xiang et al. | |
| 6,765,669 B1 * | 7/2004 | Pawluczyk | 356/326 |
| 7,315,371 B2 | 1/2008 | Kryszczynski | |

(Continued)

FOREIGN PATENT DOCUMENTS

EP   2530621 A2   12/2012

OTHER PUBLICATIONS

International Search Report in related application PCT/CA2014/050249 dated Jun. 20, 2014.

*Primary Examiner* — Kara E Geisel
*Assistant Examiner* — Dominic J Bologna
(74) *Attorney, Agent, or Firm* — J.A. Lindeman & Co. PLLC

(57) ABSTRACT

A method and an apparatus for increasing the accuracy of a spectrometer system corrects for light source quality, exposure time, distortion in y direction, distortion in x direction, temperature dependence, pixel alignment variability, dark pixels, bad pixels, pixel read noise, and pixel dark current noise. The method and apparatus produces an algorithm for optimizing spectral data and for measuring a sample within the spectrometer system using the optimization algorithm. The spectrometer apparatus comprises a composite external light source, a source light collector, an illumination light structuring component, a sample, a sample light collector, a spectrometer light structuring component, a light dispersing engine, photo detectors, an electrical signal converter, a data preprocessing unit, and a data analyzer. The method and apparatus can include a corrected photo detector algorithm, sample illumination correction algorithm, LDE-PD alignment procedure, SLSC-LDE alignment procedure, distortion correction matrix, and an algorithm for optimizing of spectral data.

22 Claims, 14 Drawing Sheets

(56) References Cited

U.S. PATENT DOCUMENTS

| | | |
|---|---|---|
| 7,359,574 B2* | 4/2008 | Lennon et al. ............... 382/274 |
| 7,583,378 B2 | 9/2009 | Rezac et al. |
| 8,655,807 B2 | 2/2014 | Multari et al. |
| 2005/0080578 A1 | 4/2005 | Klee |
| 2005/0162646 A1 | 7/2005 | Tedesco et al. |
| 2007/0216900 A1* | 9/2007 | Dalrymple .................... 356/326 |
| 2008/0118181 A1* | 5/2008 | Potuluri et al. ............... 382/275 |
| 2009/0015829 A1* | 1/2009 | Rezac ....................... G01J 3/28 356/301 |
| 2011/0007302 A1* | 1/2011 | Clark et al. ..................... 356/51 |
| 2011/0188038 A1* | 8/2011 | Gollier et al. ................ 356/328 |
| 2011/0299075 A1* | 12/2011 | Meade et al. ................. 356/326 |

* cited by examiner

APPARATUS AND METHOD FOR OPTIMIZING DATA CAPTURE AND DATA CORRECTION FOR SPECTROSCOPIC ANALYSIS

FIELD OF INVENTION

The present invention relates to an apparatus and method for optimizing data capture for spectroscopic analysis.

BACKGROUND OF THE INVENTION

Spectroscopy is a tool for remote, non-destructive, non-invasive, or minimally invasive analysis of elemental content or molecular composition of samples. Spectral content of the electromagnetic radiation (EM radiation) that is emitted by the sample under specific conditions, or produced by external source and modified as a result of interaction with the sample may be analyzed using spectroscopy.

Applications of spectroscopy include chemical composition determination, sample identification and differentiation and may be used in applications such as food processing, food sorting, petrochemical analysis; chemical composition identification of ore, minerals, pharmaceutical agents; differentiation between healthy and disease affected tissues; analysis of chemical composition of solids, powders, fluids, gases, and mixtures of states of matter; identification of chemical composition of fume exhausts, gas clouds, plasma clouds or mist clouds, detection of impurities, detection of foreign bodies, detection of biological abnormalities, identification of electromagnetic discharge, sorting of materials for industrial purposes, sorting of materials prior to processing of said materials, identification of materials prior to processing, plant identification in agriculture, environmental testing, identification of dangerous substances, identification of aromatic substances.

Over a range of wavelengths from about 175 nm to about 10,000 nm (wavelengths below 175 nm and above 10,000 nm may also be included), optical methods may be used to perform analysis of spectral composition of electromagnetic radiation. This part of the electromagnetic spectrum (from about 175 nm to about 10,000 nm) may be referred to as the optical spectrum, or "light". Methods used to analyze the spectral composition of EM radiation in an optical spectral range spatially separate different components of the spectra (i.e. spatially dispersive methods) may use dispersive optical components like prisms, periodical light-scattering structures, nanostructures, micro-mirror arrays, MEMS (microelectromechanical system) structures, diffraction gratings, or a combination thereof, as would be known to one of skill in the art. The capability of instruments using dispersive components can be dramatically expanded by using two dimensional detector arrays.

Reflecting diffraction gratings, ruled, etched or holographic, or etched, holographic or volume transmission gratings may be used for the dispersion of light. Regardless of the structure of the spectroscopic system using optical diffractive components, the general light propagation path, including conversion of information contained in the spectrum of electromagnetic radiation to an electrical signal, and treatment of this electrical signal, is similar for most if not all instruments.

Dispersive spectroscopic systems generally include a source of EM radiation, for example an external light source. Radiation from the EM source is collected using a source light collector (SLC), and the collected light is transformed into a spatial light distribution that is optimal for sample illumination. The spatial light distribution or structured illumination light, is produced using an illumination light structuring component (ILSC) and interacts with a sample to produce light that contains information about the composition of the sample. Following interaction with the sample, the information containing light may then be analyzed spectrally. The information containing light obtained from the sample is collected with sample light collector (SaLC) and delivered to spectrometer light structuring component (SLSC), which produces a spatial light distribution that is optimal for the performance of a light dispersing engine (LDE). The light dispersing engine accepts the light delivered by SLSC, and restructures the spatial intensity light distribution to obtain an efficient detection and separation of different spectral components of the light with photo detectors (PD). The photo detectors convert the optical signal into an electrical digital signal using an electrical signal converter (ESC) while preserving information extracted with spectroscopic system. The electrical digital signal is transferred to a data pre-processing unit (DPPU), where data is prepared for analysis in a data analyzer (DA) so that desired chemical information may be extracted from spectroscopically collected physical data.

Sunlight may be used as a natural source of light for many spectrometric systems, especially those which are used to analyze optical properties of the earth or any object on the earth's surface. For many applications; however, the light is produced by some artificial or synthetic means such as incandescent, halogen, metal-halogen, high pressure vapor, high pressure gas, low pressure gas and vapors, light emitting diodes (LEDs), lasers and others as would be known to one of skill in the art, can be used as a single light source or in combination to produce light with required optical characteristics. For example, light from plurality of light sources can be combined to produce light with broadband spectrum to fit requirements of the used spectral analyzer whose technical characteristics might be optimized to extract maximum information from the measured samples. Both spatial and spectral structuring of light is beneficial to optimize information to be obtained during sample analysis. By combining multiple sources comprising different spectral behaviors together, light may be structured spectrally so that it is optimized to match the properties of the sample, the spectroscopic system, or the detector.

The spectral and spatial structuring of light from one or plurality of light sources through the illumination light structuring component, may include various optical stigmatic or (and) astigmatic optical components such as lenses and mirrors transforming the collected light into a convergent, divergent or collimated light beams with different characteristics for two orthogonal propagation planes, light guiding rods, pipes and optical fibers, diffusers to scatter light for scattered light spectroscopy, polarizers to select preferred polarization of light, filters to filter out an undesired part of light, neutral density filters to adjust signal level to that acceptable by light measuring component, as well as light combiners such as beam splitters, polarization beam splitters, fiber optic combiners, prisms, dichroic mirrors, diffractive elements and others for enhancement of this light with additional band light produced by suitable light sources (various spectral lamps), or with narrow bands of light produced by LED and lasers (U.S. Pat. No. 6,765,669; to Pawluczyk, which is incorporated herein by reference, shows two light sources being combined, for example). Light produced in such way is used as a tool to extract required spectral information from the tested samples and as a carrier to deliver that information to spectral light analyzer.

The light obtained from a single light source or from combined light sources may need to be structured in different ways depending on the application. For example:

- to focus light delivered by a light source, for example a laser, into a point on the sample as for example with confocal microscopes, Raman confocal microscope, Laser Induced Breakdown Spectroscopy (LIBS); to create a high intensity light distribution along the straight or curved line, or plurality of lines, along the sample, for spectral imaging optical instrument;
- to create a high intensity light distribution of high intensity point or plurality of points along the sample in a pre-determined manner, for spectral imaging optical instrument;
- to collimate the light, to illuminate transparent samples in cuvettes with plane, parallel transparent walls;
- to produce diffused illumination for light scattering samples for diffused light spectroscopy.

Other spatial and spectral distributions optimized for the purpose of collecting optimal information from the sample may also be used. For example, in some cases it may be important to know the initial spectral composition of light delivered to the sample from an external source or plurality of sources. This may be achieved by dividing the light delivered to the sample into two light paths from which one path, for example, the more powerful path is used to illuminate the sample, while the second path is directed to separate detector to monitor the variability of light intensity produced by the light source(s). Alternatively, the intensity and spectral content of the used light may be monitored by periodically switching the light path from illumination of samples to directly coupling into the light analyzing unit through the spectrometer light structuring component (SLSC).

Upon interaction with a sample, spectrally and spatially structured light is modified as photons are absorbed, reflected, scattered, transmitted, spectrally shifted or deflected by the atoms, molecules and structures in the sample. The sample itself may also become a source of light in this process, since electromagnetic radiation of various wavelength may be emitted by the sample when for example the sample is heated to high temperatures, the sample is evaporated, electrical currents are conducted through the sample, plasma is produced using electrical current (plasma excitation), as well as other mechanisms, including luminescence, fluorescence, electroluminescence, Raman, temperature related emission, vapor or plasma emission, impact fluorescence and other light effects produced by different physical processes.

Once light interacts with, or is produced by the sample, this sample-affected light may then be processed with the subsequent parts of the dispersive spectral system. When an Illumination Light Structuring Component (ILSC) is used, there may be a need to collect the sample-affected light and restructure it for the delivery to the light dispersing engine. In this case the sample-affected light is collected with the sample light collector (SaLC) and delivered to the spectrometer light structuring component (SLSC) which produces a distribution of spatial light that is optimal for the light dispersing engine (LDE). This step may require transformation or restructuring of the collected light so that the intensity of light is spatially structured as one, or a plurality of lines projected on straight slit or slits of the LDE. These lines may also comprise a different shape, for example, to compensate for astigmatism produced by the LDE.

Restructuring of the collected light can be achieved for example, using fiber optic bundles which have a different spatial distribution of fibers at both ends of fiber optic bundle. For example, at one end, fibers can be tightly compressed into a circle, while at another end those fibers are rearranged into one or a plurality of lines to fit slit of the LDE. Alternatively, various optical components like lenses, light-conducting roads, optical fibers, light attenuators, spectral light-shaping filters, polarizers, and other optical components can be used to modify various optical properties of analyzed light, to achieve a desired performance of the spectroscopic system. Light collected with the SaLC may form a circular spot of a diameter much larger than the width of entrance of slit of the LDE, this light may be transformed by SLSC into the form of a straight line. For example, the transformation of light may involve optical devices such as cylindrical lenses, non-spherical or spherical mirrors, prisms and lenses, or fiber optics which collect light from a circular spot at one end and arrange the light in a line at the end which couples to the LDE. Another example of light restructuring involves splitting the circular spot of light in two half circles placed one over another producing an elongated light source, thereby illuminating an elongate slit (US 2011/0299075, to Jeffrey T. MEADE et al.).

Detection of dispersed light produced by the LDE may involve the use of scanning systems, for example monochromators, which extract, step by step, narrow spectral bands of light received from the LDE following sample illumination with narrow light bands. Alternatively, Czerney-Turner or Seya-Namioka spectrometers may be used. These spectrometers use a broad band spectrum of light to illuminate the sample and extract narrow bands of sample affected light for measurement. This approach presents the amplitude of a signal for a single narrow spectral band of light that is collected by a single photo detector (PD) at a given point in time. Multiple measurements for adjacent bands can be collected and processed over time for the entire wavelength range of interest. These systems are inefficient in light collection since resolution dependent, narrow bands are collected for analysis, while other bands are ignored. Therefore efficiency of these instruments deteriorates with resolution, thereby increasing measurement time and increasing the amount of unused light. The unused light contributes to increased background scatter light and further deteriorates the quality of the obtained results. Traditional LDE present spectral information in the form of a one dimensional array of data, which shows the amplitude of signal for a given wavelength, the wavelength shift, or the frequency of light.

Another method of generating data using an LDE is to use dispersive optics to spatially separate narrow bands of wavelengths of light and direct these bands to spatially differentiated points, where differentiated detector elements are located. The measurements are then performed with a linear array of photo detectors such as a line-scan camera, a plurality of adjacent photodiodes, an array of adjacent CCD (charge coupled devices), CMOS (complementary metal oxide semiconductor), an array of adjacent photomultipliers, an array of photodiodes, or other detectors as would be known to one of skill. This type of light detection is more efficient than the single photo detector method, yet the final spectral intensity distribution is presented in a one dimensional array.

The Light Dispersing Engines described above do not differentiate information collected at different spatial points along the spectrometer entrance. Furthermore, some instruments, such as Seya-Namioka spectrometers compress narrow spectral bands of light emerging from a slit to fall on a single detector without distinguishing the information content coming from different points of that slit. These spectrometers do not present information variability contained in a spatial distribution of spectrally dispersed light. However, the spatial distribution of spectrally dispersed light contains additional information about the sample under observation and the lack of differentiation of spatial distribution diminishes the utility of traditional one dimensional LDEs.

Two dimensional detectors are typically used in a manner similar to one dimensional detectors. Binning is used to produce a one dimensional array of information collected from a larger area, thus improving signal strength ("binning mode" where an electronic readout of the 2D detector is compressed to contain information in a one dimensional vector).

More complex spectroscopic data collection and spatial differentiation of spectrally dispersed light requires differentiation of both spatially and spectrally distributed light. Such systems include light dispersing systems which use an entrance slit or slits, illuminated by electromagnetic radiation delivered from a plurality of points, containing both spatial and spectral information. These advanced light dispersing systems may be used to analyze spectral information from plurality of points simultaneously and require specialized optical designs, such as aberration corrected optical design for imaging reflective gratings, optics, or the use of aberration corrected imaging lens based optics and transmission gratings (see for example U.S. Pat. No. 7,315,371; U.S. Pat. No. 6,266,140; US2005162646A1).

The light exiting currently available light dispersing engines is presented as either a one dimensional array of intensities varying for different points along the light spectrum, or a two dimensional array of intensities where one direction provides location along the light spectrum, and the other direction of the array provides information about the spatial location from which the signal was collected. Usually, these two signals cannot be considered as independent, as presence of geometric distortions shifts the spectral array for different positions along the spectral direction. The signal magnitude of each element or "pixel" of the two dimensional matrix typically corresponds to the number of photons which have been detected on the given element of the photo detector. This data is typically transformed into a digital signal by the electric signal converter which converts the optical signal (photons) into electron current. The electron current is digitized and delivered to a data pre-processing unit (DPPU) for initial processing and data optimization and finally to a data analyzer (DA) and, or display. These photon counts are typically divided into spectral bands, and typically photons of a specific narrow band of light contribute to a pixel. Photons hitting a single pixel may also include photons which have not been sorted, but are scattered or noise photons.

At each step of this process, including capturing photons, converting photons into current, and digitization, statistical processes are involved and noise elements are introduced in the analysis. Furthermore, when conversion of photons into electrons occurs, other electromagnetic radiation such as cosmic rays may also influence the conversion, in addition to scattered photons being registered on a pixel. The electronic noise of the photo detector also contributes to the overall noise. Noise of photo detector arrays is typically classified as spatial and time dependent. Furthermore, most electronic detector arrays are significantly impacted by sensor temperature. The equation:

$$SNR = \frac{PQ_e t}{\sqrt{(P+B)Q_e t + Dt + N_r^2}}$$

Describes the noise level of each individual pixel, where:
SNR is the Signal to Noise Ratio of the detector,
P is the incident photon flux,
$Q_e$ is the Quantum efficiency of the electronic detector,
t is the integration time (in seconds),
B is background photon flux due to scatter of the entire optical system,
D is the dark current value (electrons/pixel/second), and
Nr represents the read noise (electrons rms/pixel),
governs the Signal to Noise Ratio or the inherent noise level of the photo detector. Dark current is dependent on temperature, and tends to increase as temperature of the detector increases. Many methods have been developed for reduction of noise in both imaging application and spectroscopic applications. The typical approaches of averaging, binning or taking multiple measurements is flawed, as the noise profile of only the photo detector is taken into account, and the systemic noise sources of spectroscopic system are not all considered.

Most methods to process signals and reduce noise are directed to image creation, and are not optimized for spectroscopic analysis. However, many modern spectrometers utilize the photo detector signal to collect spatial and spectral information within a two-dimensional matrix with both dimensions of a matrix corresponding to the coding of spatial geometry, rather than form an image. Methods that increase the information content of the signal, and increase the signal to noise ratio are desired.

SUMMARY OF THE INVENTION

The present invention relates to an apparatus and method for optimizing data capture and data correction for spectroscopic analysis.

It is an object of the invention to provide an improved method for data capture and data correction for spectroscopic analysis.

The present invention provides methods allowing for maximum information extraction from spectral instruments that use dispersive components and two dimensional detector arrays.

As described herein, there is provided a method for increasing accuracy of a spectrometer system comprising, correcting for, one or more of a quality of light source, an exposure time, a distortion in y direction, a distortion in x direction, a temperature dependence, a variability of pixel alignment, dark pixels, bad pixels, pixel read noise, pixel dark current noise, or a combination thereof, in a spectrometer system, to produce an algorithm for optimizing of spectral data, and measuring a sample within the spectrometer system using the algorithm for optimizing spectral data. The increase in accuracy may be determined by comparing a measurement of the sample obtained on the spectrometer system before the method of correcting is carried out, with the measurement of the sample obtained on the spectrometer system after the method of correcting is carried out.

Following the step of correcting as defined above, a step of monitoring quality of the light source using one or more sample illumination monitoring channels may be performed to produce a sample illumination correction algorithm, and the sample measured within the spectrometer system using the algorithm for optimizing of spectral data, and the sample illumination correction algorithm.

Additionally, in the method as defined above, following the step of correcting, an alignment of a spectrometer light structuring component with the light dispersing engine may be performed to produce an LDE-PD alignment procedure, and the sample is measured within the spectrometer system using the algorithm for optimizing of spectral data, the sample illumination correction algorithm, the LDE-PD alignment procedure, and or a combination thereof. The method may also include a step of alignment of a spectrometer light structuring component with the light dispersing engine to produce an SLSC-LDE alignment procedure, and measuring the sample within the spectrometer system after the SLSC-LDE procedure has been followed.

The method as described above may also include a step of focusing of the light dispersing engine and photo detector, focusing of the spectrometer light structuring component and the light dispersing engine, or both, is performed.

In the method as described above the algorithm for optimizing spectral data may be obtained with the photo detector removed from the spectrometer system. Alternatively, a uniform broadband illumination or a monochromatic light source may be used to produce the algorithm for optimizing spectral data, and the algorithm for optimizing spectral data (corrected photo detector algorithm) is obtained with the photo detector installed in the spectrometer system.

In the method as described above, the dark pixels and the bad pixels may be identified by illuminating the photo detector with a uniform light for a period of time below saturation level of each pixel in the photo detector, determining the signal output from each pixel, and identifying the pixel as the dark pixel, the bad pixel, or both, if an estimated mean of the signal output of the pixel varies by more than 3 standard deviations from a mean signal output of neighboring pixels, to produce the algorithm for optimizing spectral data (or corrected photo detector algorithm). Furthermore, the pixel dark current noise may be determined by measuring a dark current value at each pixel under dark conditions and a read noise value from each pixel is determined by measuring the average dark noise under different exposure times and constant temperature conditions, to produce the algorithm for optimizing spectral data. The pixel noise resulting from temperature fluctuations may also be determined by varying temperature while maintaining the photo detector under dark conditions, and measuring the dark current value and the read noise value from each pixel to produce the algorithm for optimizing spectral data (corrected photo detector algorithm). Alternatively, the pixel noise may be corrected for the read noise by maintaining the photo detector under constant temperature and constant illumination, while varying an intensity of light, and an exposure time, and measuring the read noise value from each pixel to produce the algorithm for optimizing spectral data.

The method as described above may also include determining a spatial variation in pixel intensity and using the spatial variation to produce the algorithm for optimizing spectral data.

The method as described above may also include a step of correcting for an effect of one or more electromagnetic fields within the spectrometer system on the read noise, by periodically measuring the read noise during use of the spectrometer system and monitoring for fluctuations in the read noise.

Also provided herein is the method as described above, wherein in step of monitoring the quality of the light source, the one or more measurement, monitoring and calibration channel collects:

i) a portion of the light from the source and passes this light to the one or more measurement, monitoring and calibration channel;

ii) a portion of the light from the illumination light structuring component and passes this light to the one or more monitoring and calibration channel;

iii) a portion of the light after its interaction with the sample and the sample light collector, and passes the light to the one or more measurement, monitoring and calibration channel;

iv) a portion of the light generated by one or more sources that when combined provide a plurality of narrow spectral bands with very well defined spectral characteristics, or a plurality of broadband bands with very well defined spectral characteristics or a combination thereof to produce combined light, and the combined light is passed onto the one or more measurement, monitoring and calibration channel;

v) the light after interaction with a reference sample to produce a reference light and passes the reference light to the one or more measurement, monitoring and calibration channel;

vi) a portion of the light generated by a broadband source to produce broad band light, and passes the broad band light to the one or more measurement, monitoring and calibration channel; or vii) a combination thereof.

Further an output of the one or more sample illumination monitoring channels described above may be formed into a single line, a single curved line, two or more parallel lines, two or more curved lines, two or more non-parallel lines, a structured spatial distribution, a two dimensional array and directed onto a light dispersing engine, to produce the sample illumination correction algorithm.

In the method as described above, the LDE-PD alignment procedure may further include a step of alignment of the light dispersing engine with the photo detector using:

i) alignment channels that are selected at geometric center, and near each of the edges of the photo detector to produce the LDE-PD alignment procedure.

ii) a horizontal axis of the photo detector that is aligned with a spectral dispersion of the light dispersing engine to produce the LDE-PD alignment procedure iii) the spectrometer light structuring component that is illuminated with light that produces discrete narrow bands of light, and three or more bands of the narrow bands of light are used to monitor and correct an orientation of the spectrometer light structuring component, to produce the LDE-PD alignment procedure, or iv) a combination thereof.

In the method as described above, the SLSC-LDE alignment procedure may further comprise a step of alignment of the spectrometer light structuring component with the light dispersing engine using:

i) alignment channels are selected at geometric center, and near each of the edges of the photo detector to produce the SLSC-LDE alignment procedure ii) a vertical axis of the photo detector is aligned with a spatial distribution of the light dispersing engine to produce the SLSC-LDE alignment procedure iii) the spectrometer light structuring component is illuminated with light that produces discrete narrow bands of light, and three or more bands of the narrow bands of light are used to monitor and correct an orientation of the spectrometer light structuring component, to produce the SLSC-LDE alignment procedure, or iv) a combination thereof.

The step of alignment as described above may be followed by a step of correcting for smile (y axis), keystone (x axis) or both, to a generate distortion correction matrix.

Furthermore, in the method described above, in the step of focusing of the light dispersing engine, one or more alignment channels may be illuminated with a light source that produces one or more narrow bands of light, one or more maximum signals of the narrow bands are identified on the photo detector, and the signal is focused by adjusting an optical entrance component of the light dispersing engine, an optical output component of the light dispersing engine, or both.

A method of increasing accuracy of a spectrometer system is also provided that comprises, correcting for, quality of light source, exposure time, distortion in y direction, distortion in x direction, temperature dependence, variability of pixel alignment, dark pixels, bad pixels, pixel read noise, pixel dark current noise, or a combination thereof, in a spectrometer system, to produce an algorithm for optimizing of spectral data, and measuring a sample within the spectrometer system using the algorithm for optimizing spectral data.

Also described herein is a spectrometer system comprising, a composite external light source in optical communication with, and in optical sequence with, a source light collector, an illumination light structuring component, a sample, a sample light collector, a spectrometer light structuring component, a light dispersing engine, and one or more photo detectors, and electrical signal converter, the electrical signal convertor in communication with a data preprocessing unit, and a data analyzer, the spectrometer system further comprising one or more of corrected photo detector algorithm, a sample illumination correction algorithm, an LDE-PD alignment procedure, a SLSC-LDE alignment procedure a distortion correction matrix, an algorithm for optimizing of spectral data, or a combination thereof.

The methods described herein remove variability between spectroscopic systems so that spectrometers using different components, designs and manufacturing can be cross-calibrated and data obtained will be essentially the same if the resolution and spectral bandwidth are the same.

As described herein, in order to optimize the data collected in a two dimensional matrix, with each dimension of the matrix corresponding to an independent variable (one spatial, and one spectral), sources of error which contribute to the generation of the matrix or which impact the orthogonality of the two variables, are considered. Furthermore, methodology that monitors any time dependence on errors and that minimizes these errors in data used for final spectroscopic analysis is provided.

Reflecting diffraction gratings or holographic transmission gratings may be used for the dispersion of light. Systems with transmission gratings may be used in the invention. However, the improvements described herein may also be used in systems with reflective diffractive gratings or other dispersive components.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

The following description is of a preferred embodiment.

A method for generating, collecting, monitoring and pre-processing electronic data in a two-dimensional matrix which corresponds to spatial and spectral distribution of signal, for the purposes of spectroscopic analysis is provided herein.

Figure 1:
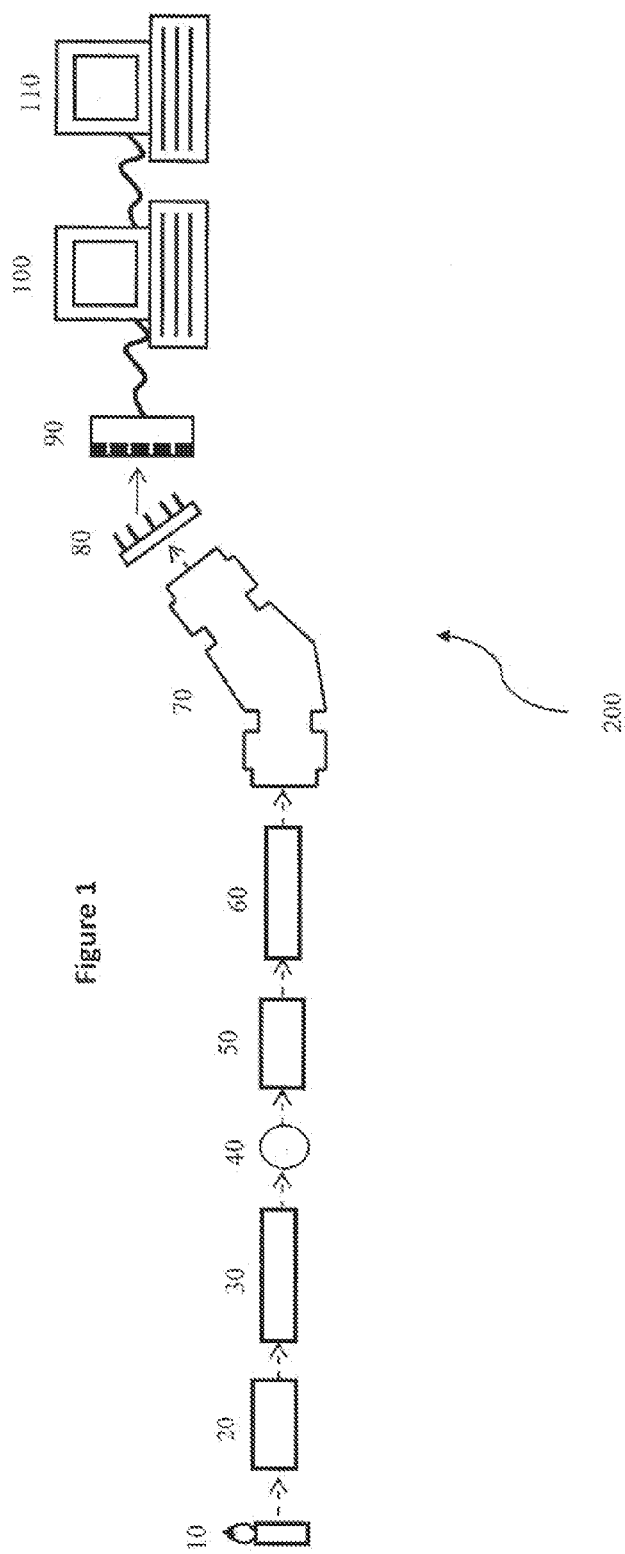
FIG. 1 shows the general layout of a prior art spectrometer system for the spectral measurement of light.

With reference to FIG. 1, there is shown a typically spectrometer system 200 comprising a source of EM radiation 10, for example but not limited to an external light source. Radiation from the EM source 10 is collected using a source light collector (SLC; 20). The collected light is transformed into a spatial light distribution that is optimal for sample illumination, for example structured illumination light, that is produced using an illumination light structuring component (ILSC; 30). Interaction of the structured illumination light with the sample 40 produces light that contains information about the composition of the sample which is then analyzed spectrally. The light from the sample is collected with sample light collector (SaLC; 50) and delivered to spectrometer light structuring component (SLSC; 60), which produces spatial light distribution optimal for the performance of light dispersing engine (LDE; 70). The light dispersing engine 70 accepts the light delivered by SLSC 60, restructures spatial intensity light distribution to obtain an efficient detection and separation of different spectral components of the light with two dimensional array of photo detectors (PD; 80). The photo detectors 80 converts the optical signal into an electrical digital signal, preserving information extracted with spectroscopic system, using an electrical signal converter (ESC; 90). The electrical digital signal is transferred to a data pre-processing Unit (DPPU; 100), where data is prepared for analysis in a data analyzer (DA; 110), for the extraction of desired chemical information from spectroscopically collected physical data.

Multiple factors affect the integrity of a signal which is generated by the ESC 90 and data which is made available for analysis by the DPPU 100. The quality of signal for analysis by the DPPU 100 is a combination of time-dependent time-fluctuations of one or more components, including all of the components, of the spectroscopic system, the optical aberrations and noise produced by the opto-mechanical design of the spectroscopic system, and of electronic noise and artefacts introduced by the mechanical and electronic devices converting photon flux to electronic signal.

Figure 2:
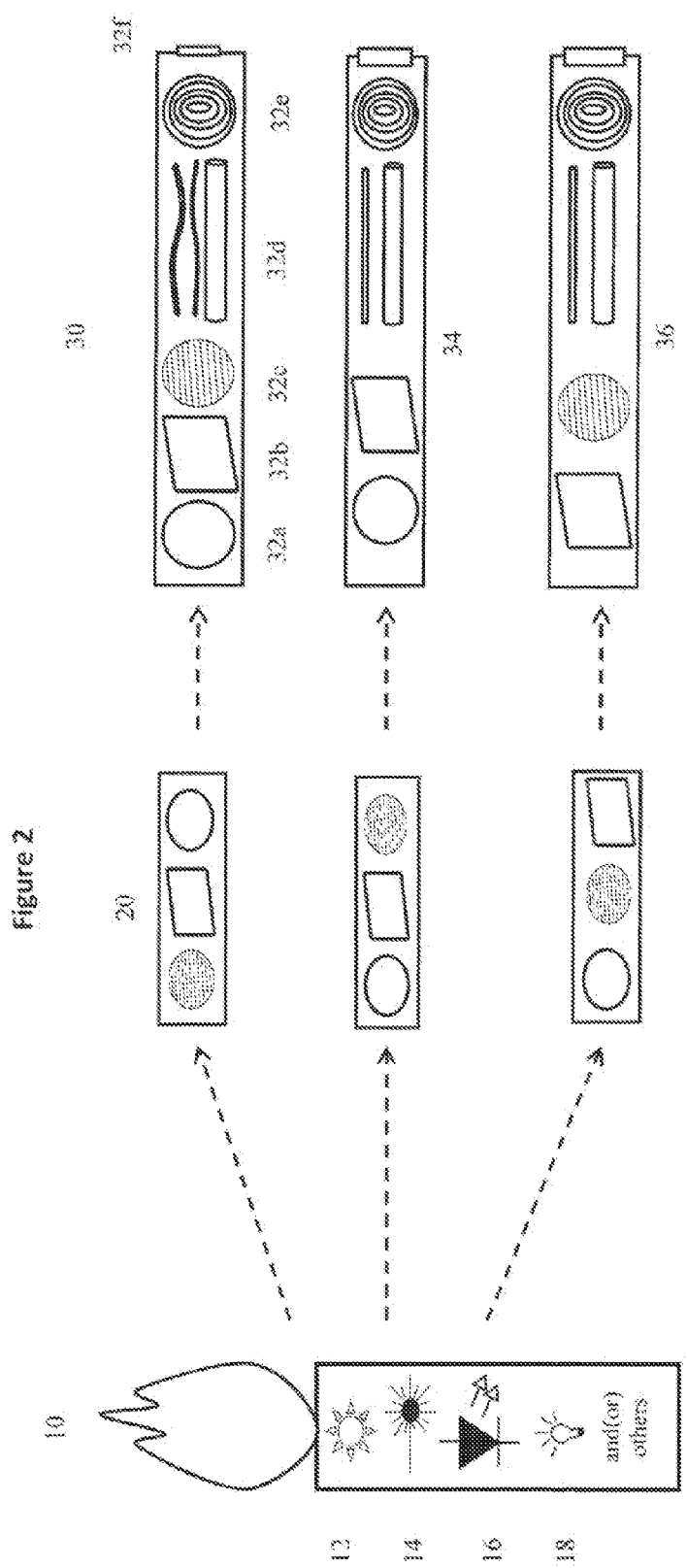
FIG. 2 shows various sources of light used in spectroscopy and for spectroscopic analysis. Functional parts of a sample illuminating track comprise a composite external light source 10, that may include natural external light 12, lasers 14, LEDs 16, incandescent light 18, vapour halogen, high pressure vapour and gas sources, and a combination thereof. Each of these sources may be used as stand-alone light source or in combination with other light sources. A source light collector (SLC) 20, for collection of light from a composite external light source 10 may contain lenses (shown schematically as clear rectangular shapes) to collect light from a single or plurality sources, light combiners, filters (shown schematically as circular hatched filled shapes), attenuators (shown schematically as circular grey filled shapes), and optical components required for functionality and predestination of spectroscopic system. An illumination light structuring component (ILSC) 30. The ILSC may contain optical components such as a source light collector (SLC) and include optical light guiding rods and fiber-optic components (shown schematically as lines and rods).

Additional features of the sample illumination track are shown in FIG. 2. The EM radiation source may comprise a composite external light source (generally shown as 10), and may include a large variety of light sources used in spectroscopy, including natural external light 12 and various human-produced light sources as, lasers 14 LEDs 16, incandescent light 18, halogen, high pressure, gas and vapour, vapour, or a combination thereof.

The SLC 20 is used for the efficient collection of light from the composite external light source 10 and can comprise lenses to collect light from a single or plural source, light combiners, filters, attenuators, and other optical parts which are required for proper functionality and predestination of the spectroscopic measurement system. The role of some of those parts can be performed by a free space light path, light conducting rods, light wave guides, single optical fibre, multi-fibre bundles, multi-fibre branched bundles, and so on (shown schematically as solid lines and rods in FIG. 2). The light coming from the light source used to create the composite external light source 10 can be branched using various of optical elements known for those skilled in the art to generate one or more branches (or channels, see below) for each or selected individual light sources, or light produced by the composite external light source 10 for testing and evaluation. For example, evaluation of spectral composition of light delivered by each or selected light source(s) as well as the light coming from the composite external light source 10 for the measurement of stability to use it to provide reference for spectral measurement of the sample. This is described in more detail below.

The ILSC 30 may comprises optical parts, including lenses (schematically shown as a grey filled shape in FIG. 2; 32a) and focusing lens to create collimated light beam for: concentration measurement in cuvettes with plane parallel windows; point illumination for confocal microscopy; light line forming component for line imaging or simultaneous Raman excitation for Raman line imaging, as would be known in the art. A diffuser, beam splitter, polarizing component or related component is schematically shown as a clear rectangular shape 32b, and a spectrum shaping filter, attenuator, absorber, narrow band filter, band pass filter, laser line narrowing filter is represented by a hatched filled shape 32c. Components 32d can be interpreted as various lights guiding ways including: free space light path for example air, light conducting rods (rod like shape in FIG. 2), light wave guides, single optical fibre, multiple fibres bundles, multi-fibre branched bundles (shown as solid lines), and so on. Component 32e represents an optical component which is placed directly in front of a sample and comprise one or more lenses, Fresnel lenses, binary components, special light structuring components producing various patterns of light intensity distribution on samples: small spot of focused light, illumination of samples with multiple small spots of focused light, light distributed along straight or curved line which can create any closed figures like circles, squares, hexagonal patterns and so on. Component 32f may represent free space or a window placed in front of a sample 40 which can may or may not function as a light shaping filter, heat rejection filter, attenuator, polarizer, and diffuser and so on. As one of skill in the art would recognize, the function and order of the optical parts used in the set of optical components within the ILSC 30 can be changed depending on the role and specific requirements of final spectrometric system as shown by optical component arrangements 34 and 36. Moreover, one of skill in the art understands that the optical functions of the ILSC 30 can be shared with the SLC 20 and these two components together with the composite external light source 10 determine the final spectral spatial illuminating condition for a sample under the spectroscopic test performed with the use of spectroscopic measurement system 200.

Figure 3:
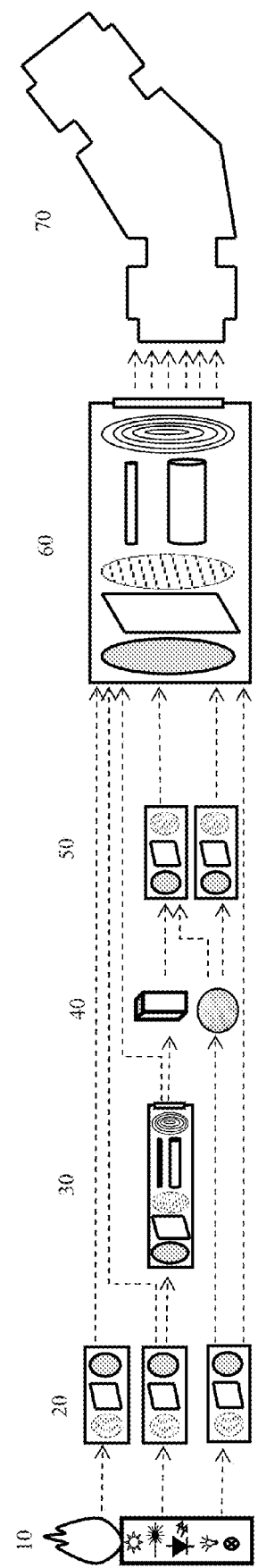
FIG. 3 shows schematic examples of optical paths and typical optical elements that may be used for shaping of light collected from one or more sources 10 or a sample 40 for spectral measurement of light. Several optical paths of light from the composite external light source 10 to the sample 40, and from the sample 40 to the light dispersing engine 70 are shown. The sample light collector 50 and spectrometer light structuring component 60 can be used to project and spatially distribute the light collected from the sample into the entrance of the light dispersing engine 70. Source light collector 20; sample light collector 50; spectrometer light structuring component 60; light dispersing engine 70.
Figure 6:
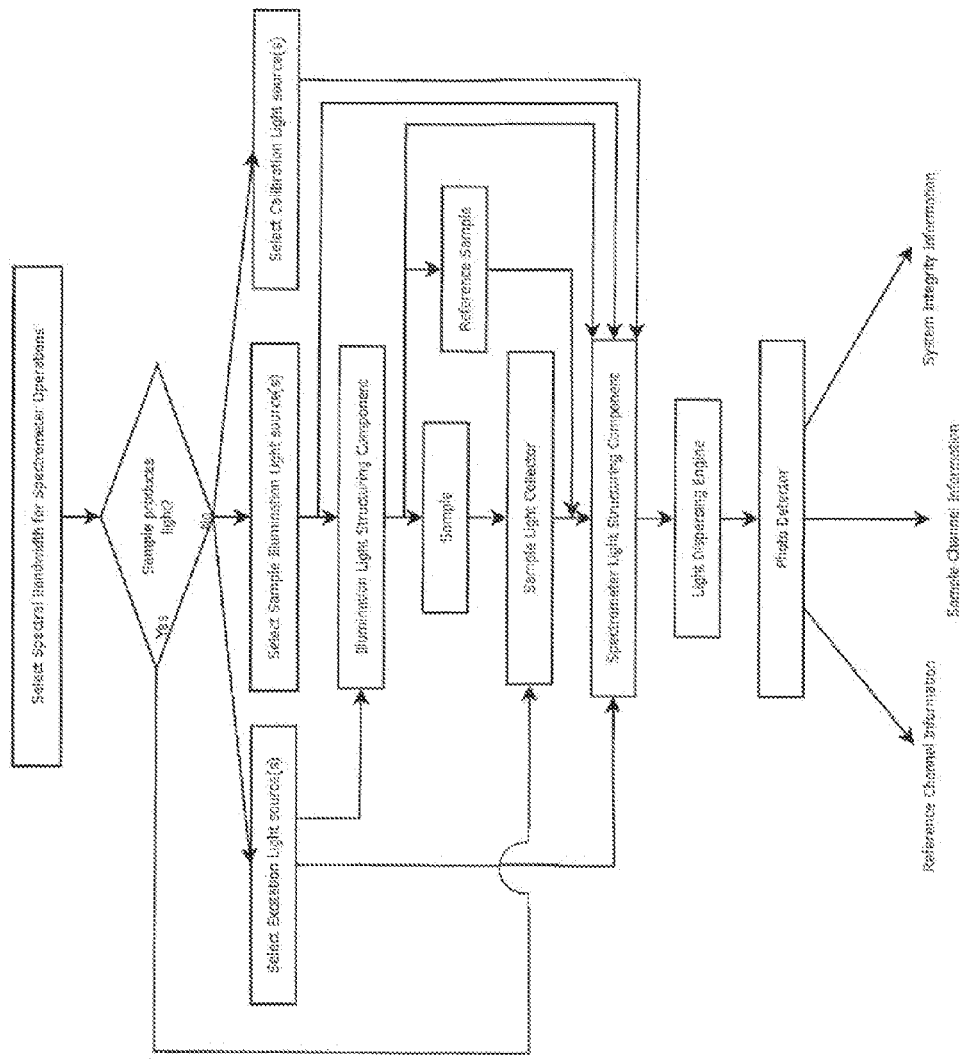
FIG. 6 shows a flowchart outlining several steps that may be used for light collection and management, including light path formation, optimization, collection and delivery of the light into the spectral engine (light collection and management path).

FIG. 3 shows several possible optical paths of light from the composite external light source 10 to the sample 40 and from the sample 40 to the LDE 70. Various light paths are also shown in FIG. 6. The SLC 30 and SaLC 50 may comprise various optical components for efficient light collection from the sample that is used to deliver structured light via the SLSC 60 to the LDE 70. The Sample 40 may be any state of matter such as liquid, solid, gas or vapour, plasma; remote objects like stars, galaxies, inter-galactic clouds, planets, or any object on the surface of the planet, including both living and non-living objects. Moreover, it can also be medical, industrial, chemical or other substances, pieces of arts, created by nature or human-produced, or any combination of the above. The SLC 50 may comprise similar components as the SLC 20. These optical components may vary in number, functionality and order.

Figure 4:
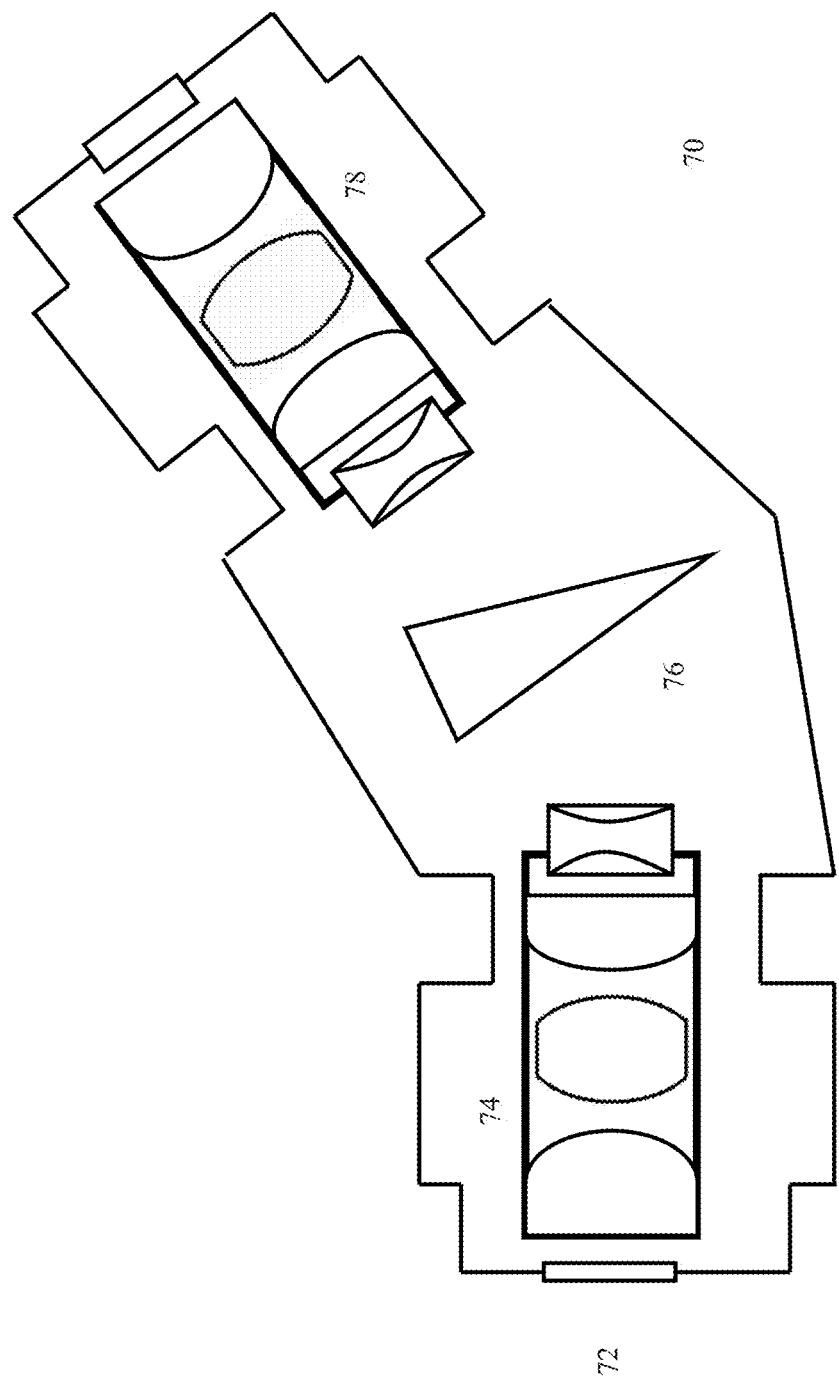
FIG. 4 shows a block diagram of components of an example of an optical dispersive spectral engine or light dispersing engine (LDE) and shows an optical entrance component 74, a light dispersing element 76, and an optical output component 78.

The LDE 70 (FIG. 4) comprises an entrance port 72 that receives light produced by the SLSC 60. An optical entrance component 74 then collects the delivered spectral and spatial structured light and transforms this light to a light distribution optimized for the light dispersing element 76. The light dispersing element 76 angularly changes the propagation direction of each spectral component of the delivered light. The light angularly is redirected according to its wavelength and is captured by an optical output component 78. The optical output component 78 orders the light delivered by the Light Dispersing Element 76.

Figure 5:
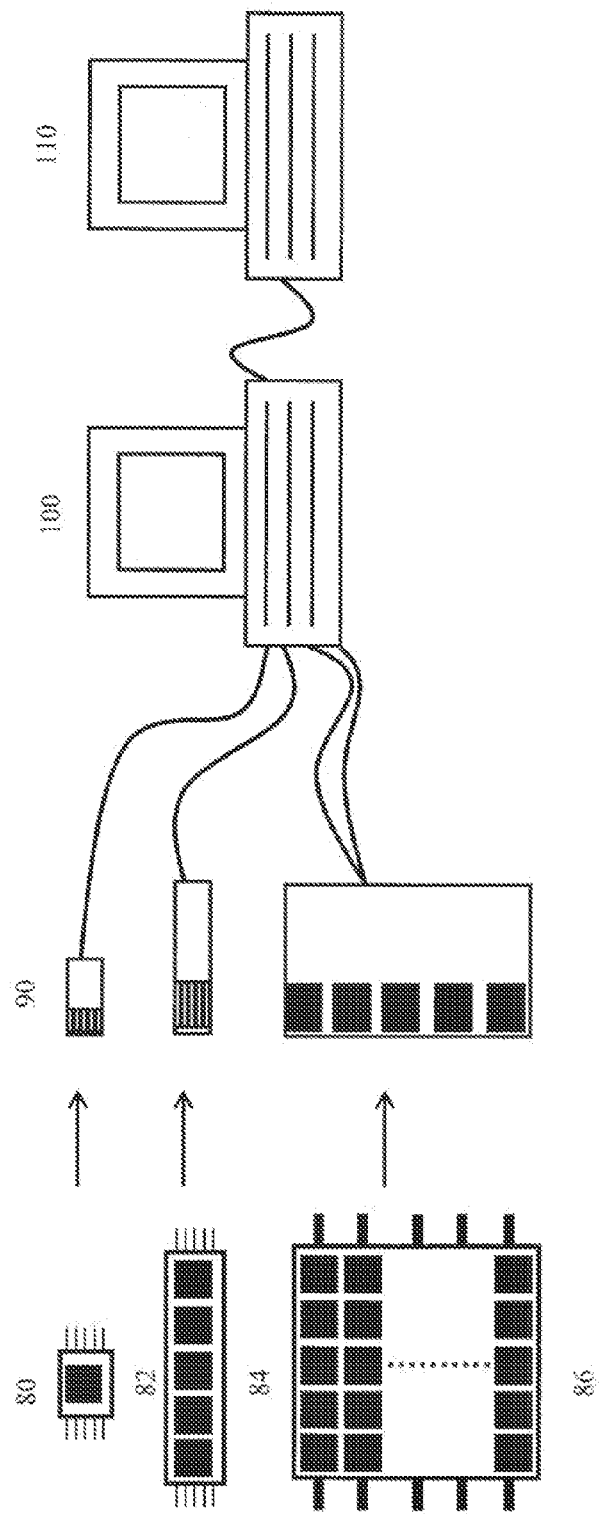
FIG. 5 shows a schematic of possible spectrometer systems which relate to detection of dispersed light, conversion to an electrical signal and a data analyzing unit; photo detectors 80, electrical signal converter 90, data pre-processing unit 100, and data analyzer 110.

A photo detector 80 (FIG. 5) is used to register the light produced by LDE 70. Any type of PD 80 may be used as would be known by one of skill in the art. The LDE 70 may be designed so that a light of narrow spectral band of light around certain wavelength is captured by a single detector 82 at a certain moment of time. Additional spectral bands, placed close to the first band, may be registered in the same manner, and the collection of measurements obtained may be represented in the form of a graph, presenting intensity of the collected light as a function of wavelength. The PD 80 may also comprise a one dimensional detector 84. In this configuration, the LDE 70 projects a narrow band of light with different central wavelength on the different sensors of the linear array. As a result, simultaneous different parts of spectra may be registered and presented in a similar way as with a single detector 82. The main difference is that single detector collects different spectral components at different moment of time, while the linear array of detectors allows registering different spectral components simultaneously. Application of two dimensional array of detectors 86 allows registration of a two dimensional distribution of light intensity produced by the LDE 70 which transforms the light structured with the SLSC 60 to the light distribution presenting spectral dependence on a spatial position of an analyzed point, and this permits simultaneous measurement of spectral characteristics at different points of the sample 40 at the same time. Each point on the structured light intensity distribution corresponds to a line of detectors assigning each part of the detector to a particular wavelength of the light. As a result two dimensional light distribution containing information related to the position of source points from structured spatial light intensity distribution and spectral data related to the light coming from each point are mapped on the surface of detectors. Since these two components are fully independent, from the mathematical point of view they create two mathematically orthogonal sets; therefore, for mathematical analysis it is beneficial to represent the result in the form of two dimensional array with one dimension representing only spatial position of light source and the second dimension representing only spectral distribution.

During exposure to the light, the detectors perform energy conversion of absorbed light photons into electron charge, proportional to the total light absorbed by the detector. The ESC 90, measures the electrical charge produced by PD 80 and the size of the charge is presented in the digital form. This information about the charge is transferred to DPPU 100 for optimization for use by the DA 110. The data analyzer 110 extracts useful chemical information about the tested sample from the data produced by the Spectroscopy Measurement System. Algorithms within the DA 110 are used to process the incoming data obtained from the sample and may be of any type as would be determined by one of skill in the art.

As described herein, in order to optimize the data collected in a two dimensional matrix, with each dimension of the matrix corresponding to an independent variable (one spatial, and one spectral), all sources of error which contribute to the generation of the matrix need to be considered. Furthermore, methodology that monitors any time dependence of errors and that minimizes these errors in data used for final spectroscopic analysis needs to be developed. These methods consider the sources of noise, distortions time dependent and fluctuations both in spatial and spectral domain of spectroscopic systems which include sub-components shown in FIG. 1, including the light source 10, the SLC 20, the ILSC 30, the sample 40, the SLC 10, the SaLSC 50, the LDE 70, the PD 80, the ESC 90 and the DPPU 100.

Two dimensional photo detector arrays 80 permit spatially distinguishing spectroscopic information obtained from different positions along the entrance of the LDE 70. The ability to spatially distinguish spectroscopic information is used, as described herein, to provide multiple spatially and spectrally distinguished spectral channels for the purposes of monitoring, measuring and calibrating the light coupled into the LDE 70. Channels are formed by collecting light into the SLSC 60 which assigns a spatial position of each channel to a specific position at the entrance of the LDE 70. The use of spectral channels in optimizing spectroscopic data provided for spectroscopic analysis by the DPPU 100 is described below.

The light source 10 is a source of signal errors, distortions and time dependent fluctuations in spectroscopic data. In addition to monitoring the light source 10, using standard methods as known in the art as previously described, it may be necessary to monitor the light which is used to illuminate the sample 40. This may be done by forming a separate, sample illumination light monitoring spectral channel. A portion of light used to illuminate the sample 40 is collected and coupled directly to the SLSC 60 at the entrance of the LDE 70 in such a way that a part of the LDE 70 is used to disperse the sample illuminating light without interacting with the sample, and subsequently collected on the corresponding portion of the PD 80. This approach allows for continuous and simultaneous monitoring of light used to illuminate the sample 40 at the same time that light collected from the sample 40 is being collected and processed by the SLSC 60, the LDE 70, the PD 80, the ESC 90, and the DPPU 100.

Also contemplated is the use of one or more measurement, monitoring and calibration channels may also be used as follows (see FIG. 3 and FIG. 6 which show various channels the light path may use):

1) A sample illumination monitoring channel (described above). This monitoring channel obtains a portion of the light from the source 10 and passes this light to the SLSC 60 (or the measurement, monitoring and calibration channel);

2) A sample measuring channel which collects light after its interaction with the sample 40 and after collection by the SLC 50 and which passes light to the SLSC 60 (or the measurement, monitoring and calibration channel).

3) A spectral integrity monitoring channel which collects light generated by a source 10 such as a spectral lamp, a combination of several well defined spectrally LEDs, or a combination of several well defined lasers, which when combined provide a plurality of narrow spectral bands with very well defined spectral characteristics, and passes light to the SLSC 60 (or the measurement, monitoring and calibration channel). This channel permits the real time monitoring of thermo-mechanical disturbances to the spectroscopic system which may cause small spatial shifts in wavelength band captured on the photo detector 80 array.

4) A reference sample monitoring channel which collects light after interaction with a reference sample 42 and passes this light to the SLSC 60 (or the measurement, monitoring and calibration channel). This channel permits the real time monitoring of differences between the sample 40 being tested and a reference sample 42. For example, a synthetically created reference sample 42 which has similar properties to one or more samples 40 being tested (e.g. the reference sample may be referred to as "a phantom,") can be used to detect very small changes in spectral composition of light after its interaction with the sample 40 being tested.

5) A spatial integrity monitoring channel which collects light generated by a broadband source 10. This channel permits the real time monitoring of the spectroscopic system environment as well as local system fluctuations by detecting small changes in signal intensity due to thermal, electronic and mechanical disturbances. This channel collects light generated by a broadband source 10 and passes the light to the SLSC 60 (or the measurement, monitoring and calibration channel), or 6) a combination thereof.

A plurality of channels as described above may be used to monitor the performance of the spectroscopic system 200. Any combination of one or more of such channels, including multiple channels of one type may be used. The channels may be distributed in any fashion on the detector (PD 80), and the information from each of the monitoring channels may be used periodically, including during initial alignment and calibration of the spectroscopic system 200, or in real time for the purposes of optimizing spectral information for data analysis.

Tasks assigned to channels may change over time, so that each channel can be switched from monitoring one aspect of the spectroscopic system to monitoring another aspect or the channel may be assigned as a measurement channel. Also, each channel may be assigned a different portion of the array of the photo detector 80 and may correspond to a different size of a portion of the photo detector 80 as well as different position on the photo detector 80 both in a spatial and spectral dimension. The information contained in these channels may also be used individually or in combination for the purpose of optimizing spectral information for data pre-processing (via the DPPU; 100) or for spectral analysis (using the DA; 110).

Figure 7:
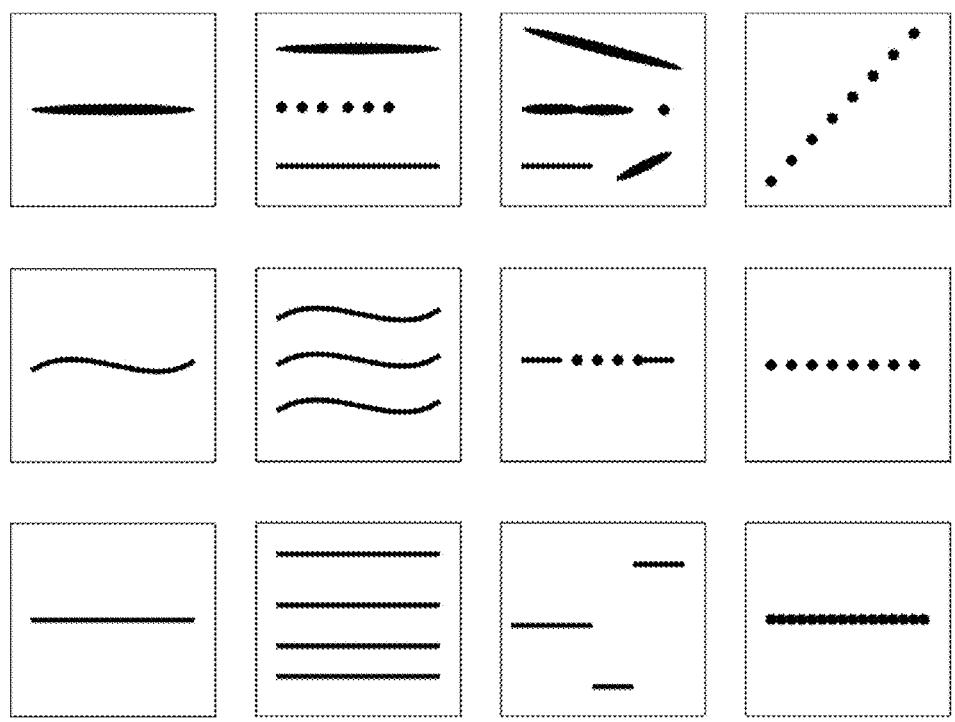
FIG. 7 shows example of shapes that the spectroscopic light structuring component may take.

The plurality of channels as described above may be arranged by the SLSC 60 into various structured light configurations (see FIG. 7). The simplest configuration forms a straight line of one or multiple channels which is then coupled into the LDE 80, as used by the majority of classical spectrometers (see FIG. 1). Additionally, as described herein, one or more channels may be formed into a two dimensional array. For example, the channel(s) may form one or more of the following channel structures:

a. A single line, including a straight line, an undulating or wavy line
b. A single curved line
c. Two or more parallel lines
d. Two or more parallel curved lines
e. Two or more non-parallel and non-congruent lines or curved lines
f. A structured spatial distribution, for example any pre-defined structure that can be mapped spirals, circles, ellipses, flattened ellipse, undulating or wavy lines, or any other predetermined shapes.

The above structures of channels are directed to the SLSC 60 and passed to into the LDE 70, which disperses the light from each channel onto a pre-determined area of the PD 80 which allows for spatial and spectral coding of each channel. For example, the PD 80 may comprise a two dimensional array of photosensitive material, so that the absorption of photons by the PD 80 are matched to the desired spectral band of the spectroscopic system (i.e. matched to the dispersed light output from the LDE 70). For example which is not to be considered limiting, a Si detector may be used for spectroscopic systems which analyze light wavelengths under 1050 nm, an InGaAs detector may be used for spectroscopic systems which analyze light between 850 to 1700 nm, and MCT detector may be used for spectroscopic systems between 800 and 2800 nm. Of course other sensitivity optimized detectors may be used for other spectral ranges as would be known to one of skill in the art.

The photo detector 80 converts photons which fall on specific elements or pixels of the PD into an electron charge, which is subsequently converted into electric current proportional to the number of photons which interacted with a given pixel. This is a stochastic process but the PD 80 errors and instability are further influenced by any defects of individual pixels of the PD 80. For example, some pixels are not in proper electrical communication or otherwise properly connected to the electronic readout, or have physical defects which prevent conversion of photons into electrical current. This creates several types of noise:

a. a stochastic noise which is related to the statistical fluctuation of physical events such as number of photons hitting a pixel, or number of electrons produced by the pixel for a given number of photons (this is influenced by the conversion efficiency or the quantum efficiency) is a well-defined process and can be minimized and optimized for spectral analysis by the data analyzer 110 using various statistical models (as would be known to one of skill in the art), through gathering of statistical information over multiple measurements, or a combination thereof;

b. a noise introduced by the physical differences between pixels, where small variations in the pixel formation contribute to variability in individual stochastic processes for individual pixels; and c. a combination thereof.

The electric current generated by each pixel is subsequently digitized by the ESC 90 and is then transferred to the DPPU 100. The conversion of photons to digital signal may also contribute to the noise, error, distortion and fluctuations of the signal which is made available for spectral analysis using DA 110. The reduction or elimination of these types of artifacts are considered below.

Noise of Photo Detector arrays is typically classified as either spatially or time dependent. Furthermore, most electronic Photo Detector arrays are significantly impacted by sensor temperature. The quality of the signal obtained by the Photo Detector is often described as the Signal to Noise Ratio, and is governed by the previously mentioned equation (presented below in an expanded form):

$$SNR = \frac{PQ_e t}{\sqrt{PQ_e t\left(1 + \frac{\Delta P}{P} + \frac{\Delta Q_e}{Q_e} + \frac{\Delta t}{t}\right) + BQ_e t\left(1 + \frac{\Delta B}{B} + \frac{\Delta Q_e}{Q_e} + \frac{\Delta t}{t}\right) + Dt\left(1 + \frac{\Delta D}{D} + \frac{\Delta t}{t}\right) + N_r^2}}$$

Where:

SNR is the Signal to Noise Ratio of the detector pixel,
P is the incident photon flux,
$Q_e$ is the Quantum efficiency of the Photo Detector,
t is the integration time (in seconds),
B is background photon flux due to scatter of the entire optical system,
D is the dark current value (electrons/pixel/second), and
$N_r$ (read noise) represents the read noise electrons root mean squared per pixel (electron rms/pixel), governs the Signal to Noise Ratio or the inherent noise level of the system.

As can be seen from the expanded Signal to Noise Ratio equation, the noise is also dependent on fluctuations occurring at a given time for each variable. As described herein, it is possible to remove some of these sources of noise (FIG. 8) to obtain a corrected photo detector algorithm (algorithm for optimizing spectral data) that may then be used within the spectrometer system for the analysis of one or more samples.

The dark current, D, is dependent on temperature, and tends to increase as temperature of the detector (PD, 80) increases. By keeping the temperature of the detector array constant, and taking several measurements at different exposure times, but with no incident electromagnetic radiation on the detector (complete darkness, so that both P and B approach 0), then it is possible to determine both D and $N_r$, so that their dependence on the exposure time is obtained. Similarly, while varying temperature, it is possible to predict the dependence of these two noise factors on temperature as well. Using this method, noise characterization of both dark current and read noise is required for optimal preparation of data for spectral analysis using any methods known by one of skill in the art. Noise systems with noise centered around some mean $\mu_{dark}$, can be considered as a constant noise, and the mean of the noise $\mu_{dark}$ at some pixel at position (x,y) can be subtracted from the measurement to eliminate the contribution of the dark current noise. The dependence of noise at each pixel (x,y) on temperature and exposure time is then independent of the dark noise and can be used as correction factors for each pixel (x,y) to eliminate those dependencies on noise.

Introducing a reference channel which is able to monitor ΔP, ΔB, ΔQ (i.e. the change in P, B, Q, respectively) and at the same time as the measurements are taken, allows these sources of error to be compensated for.

To correct for temperature fluctuations, two or more measurements, and if increased precision is required, a higher number of measurements as required to obtain desired performance, for different temperatures which fall within the operating temperatures of the system, are taken (for typical photo detectors the operational temperature is −20 to 40 deg C.; for example, 3 steps at −20, 0, and 20 deg C. may be measured). These measurements may be obtained in the dark (so that P and B approach 0), in the absence of any illumination, or they may be obtained under uniform illumination conditions. The collected measurements are analyzed to determine the linear fit (or a higher order polynomial in the case where more measurements are taken), to determine how the dark current D(x,y), varies with temperature.

To correct for reading noise $N_r(x,y)$, three or more measurements, and if increased precision is required, a higher number of measurements as required to obtain desired performance, may be taken for constant temperature and constant, uniform illumination for different exposure times (t). For example, if three such measurements are taken, one may be obtained at 80% of maximum intensity, one at 50%, and 20% of maximum intensity. The desired intensities may be achieved by changing the exposure time. Other percentages of maximum intensity may also be measured as desired. The selected ranges may vary depending on the expected operation of the PD 80. However, for optimal operation it may be desired to not saturate the detector, yet collect a large amount of signal so that the dynamic range of the ESC 90 is utilized properly. In this case, by measuring three or more different exposure times allows for the determination of the mean of the constant contribution of the reading noise, Nr(x,y), which is subsequently subtracted from the corresponding measurement results for each pixel.

The exposure times of a PD 80 are controlled by a digital electronic mechanism. Therefore, exposure time may be set as an integer multiple of the smallest digital clock time interval. This setting may be of importance for measurements which require short exposure times. This may be done by determining the digital clock speed and then setting the appropriate exposure time as an integer multiple of the smallest digital clock time interval.

Dark measurements may be taken at the start of any measurement procedure, and subsequently on hourly basis if no modifications to settings are performed for a measurement (so temperature, exposure time, and mechanical aspects of the spectroscopic system are kept constant). These measurements are performed with the spectroscopic system to detect any time dependent changes in the dark current (D) which may indicate temperature instability of the PD 80 or deterioration of the state of the entire spectroscopic system. Since a change in dark current is related to changes in temperature, the dark current may be used to monitor temperature sensitivity of the PD 80.

Furthermore, PD 80 may have specially designed dark current areas, which are never exposed to light, with these types of photo detectors, the dark current may be used to estimate temperature (T; as both T and D are measured over time, an estimate of T may be obtained based on the data acquired, by measuring D) of the detector simultaneously with the measurement. This step may provide an early warning of changes in experimental design and allows for user intervention if the subsequent dark current measurements statistically vary by more than one sigma from the overall mean (see below). Similarly, reading noise Nr may be measured at set intervals to indicate functionality of the entire spectroscopic system (i.e. any change in the read noise Nr over time may indicate a change in performance of one or more components in the spectroscopic system). This maybe a relevant test as many PD 80 are sensitive to electromagnetic fields and electrical current fluctuations and deteriorate over time.

Photo detectors 80 may be subject to faulty construction, so that some portion of pixels in a detector either does not generate any current ("dark pixels") or generate current which is not correlated to the number of photons incident on such a pixel ("bad pixels"), finally, sometimes a random cosmic ray excites given pixel(s) and generates current which is not correlated with the number of photons incident on such pixel(s), however, this is a random occurrence and does not repeat for the same pixel(s) over a period of time.

In order to optimize data obtained from a PD 80 and ESC 90, the following method to identify and correct for "dark pixels" and "bad pixels" may be used. For precise measurements of samples, this method may be performed on the PD 80 without an attached spectroscopic system 200. If less precision is required, then testing of PD 80 may be carried out while within the spectrometer and the testing carried out either in the dark, or using uniform illumination, or monochromatic light, to determine signal variation in the PD 80 as described below. Since many detectors provide non-uniform response to the same stimulus across multiple detector elements (pixels), statistically significant difference in response of pixels from the standardized performance of the detector may be flagged, eliminated, corrected or a combination thereof. The testing of the PD 80 may be carried out as a routine procedure to monitor any changes in the detector, or it may be carried out on a periodic basis as desired.

To identify "dark pixels" or "bad pixels" (see FIG. 8) the detector (PD 80) is illuminated with uniform, broadband light to which it is sensitive and the output signal determined. The exposure time of the detector is selected to avoid detector saturation for "typical" pixels. A typical pixel is defined as a detector element which produce signal within 3 standard deviations of the mean value of their 8 (3×3) surrounding pixels. A square of 1 pixels on each side of the pixel under consideration was chosen for an example of an embodiment, to detect groupings of several neighboring pixels which may be defective. Other numbers of neighboring pixels may be selected, depending on the type of detector used and precision of measurement needed.

If the spectroscopic information is encoded in a 2D array with one axis as spatial, and one axis as spectral information, then the statistical methods described herein may be performed independently for those two axes.

Figure 9:
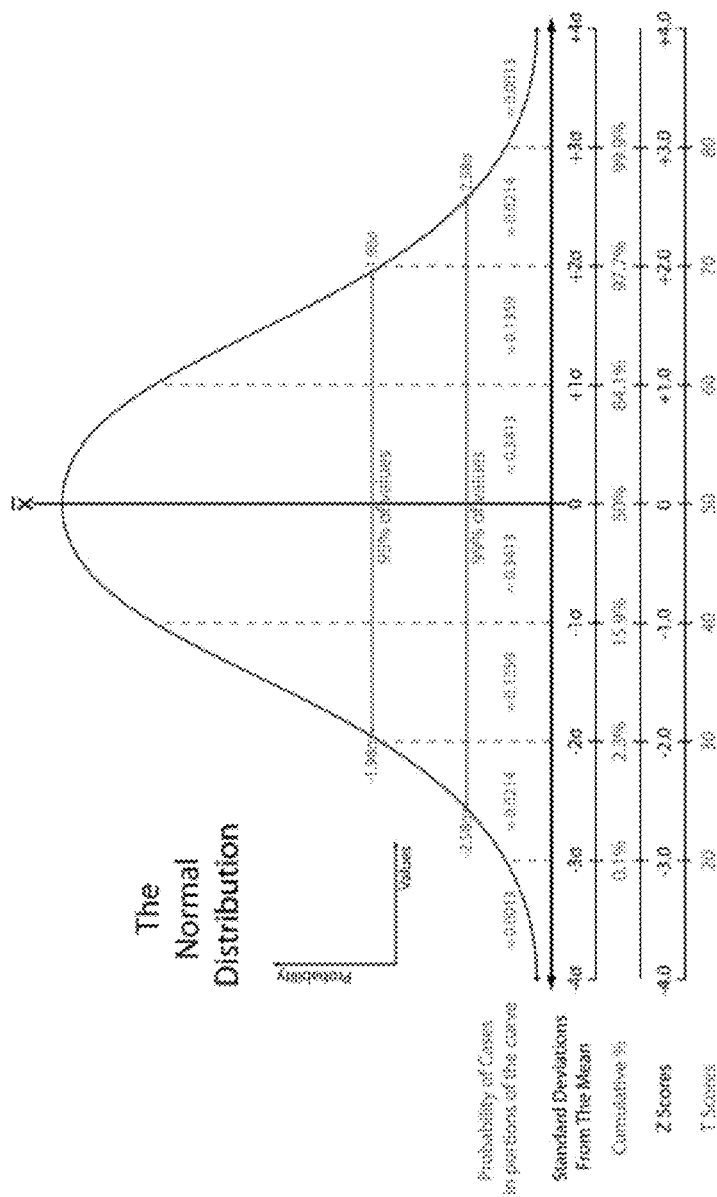
FIG. 9 shows a normal distribution and the probability curve (a Gaussian distribution) indicating one sigma, two sigma, three sigma and four sigma standard deviations from the mean and associate cumulative % for each of these standard deviations.

The Normal, or Gaussian distribution (e.g. see FIG. 9) is governed by the equation $$f(x) = \frac{1}{\sigma\sqrt{2\pi}} e^{-\frac{(x-\mu)^2}{2\sigma^2}}$$

Where:
sigma ($\sigma$) corresponds to standard deviation and
$\mu$ is the mean value.

Although other distributions do govern the statistical variability of physical processes, the Gaussian distribution is often used as a good approximation of those other distributions. In this example a Gaussian distribution has been selected, although other distributions such as Poisson, Uniform, Standard Normal and others may also be used. As described herein a pixel may be determined as being a bad or dark pixel if the signal from the pixel varies from the measured signal by more than 3 sigma (see FIG. 9). This means that if the estimated mean of a pixel varies by more than 3 standard deviations from the mean of its neighboring pixels, that pixel is "bad" and should not be taken into account for spectral analysis. Of course, other values of sigma multiplier may be used, and for more precise measurements, the multiplier may be higher than 3, but for less precise measurement sigma multiplier values of 1 and up are typically acceptable, since the probability that a pixel is correct is around 67%. Depending on required precision and location of the pixel under investigation, other values for standard deviation multiplier and number of pixels used to determine the mean can be used. The pixels selected to calculate the mean estimation also must conform to the noise test of using 3 standard deviations, excluding the initial pixel under investigation. This suggests that to obtain high quality data, the edge columns and rows of a detector (PD 80) should be omitted, and the number of edge rows or columns will be dependent on the number of pixels used to calculate the mean. For example, 1 rows and columns from each edge may not be considered for spectral analysis. Of course, other methods of selecting neighboring pixels can be used, for example, circular, hexagonal, octagonal, rectangular, weighted versions of the n neighboring pixels, or other shapes. The pixels which, in our example embodiment do not pass the 3 sigma test, are considered as "bad" pixels. Furthermore, this process of pixel identification should be repeated at least three times to avoid misidentifying pixels which have been exposed to cosmic rays. Similar test is conducted in a dark environment, so that pixels which generate signals which are statistically too high can also be identified.

Using the process described above to eliminate "bad" pixels, the mean value of neighboring pixels as predicted, for example, by a Gaussian Distribution (see FIG. 9) can be substituted for the "bad" value. Other methods, using different size and shaped neighborhoods can be also used to substitute value of the "bad" pixel. For example, circular, hexagonal, octagonal, rectangular, and weighted versions of the n neighboring pixels, or other statistical methods of predicting a mean value of a pixel based on its neighbors may be utilized, and may include Savitzky-Golay filter, 2D mean smoothing filters, Fourier Transform (FT) smoothing filters, logarithmic smoothing filters and others can be used.

Figure 8:
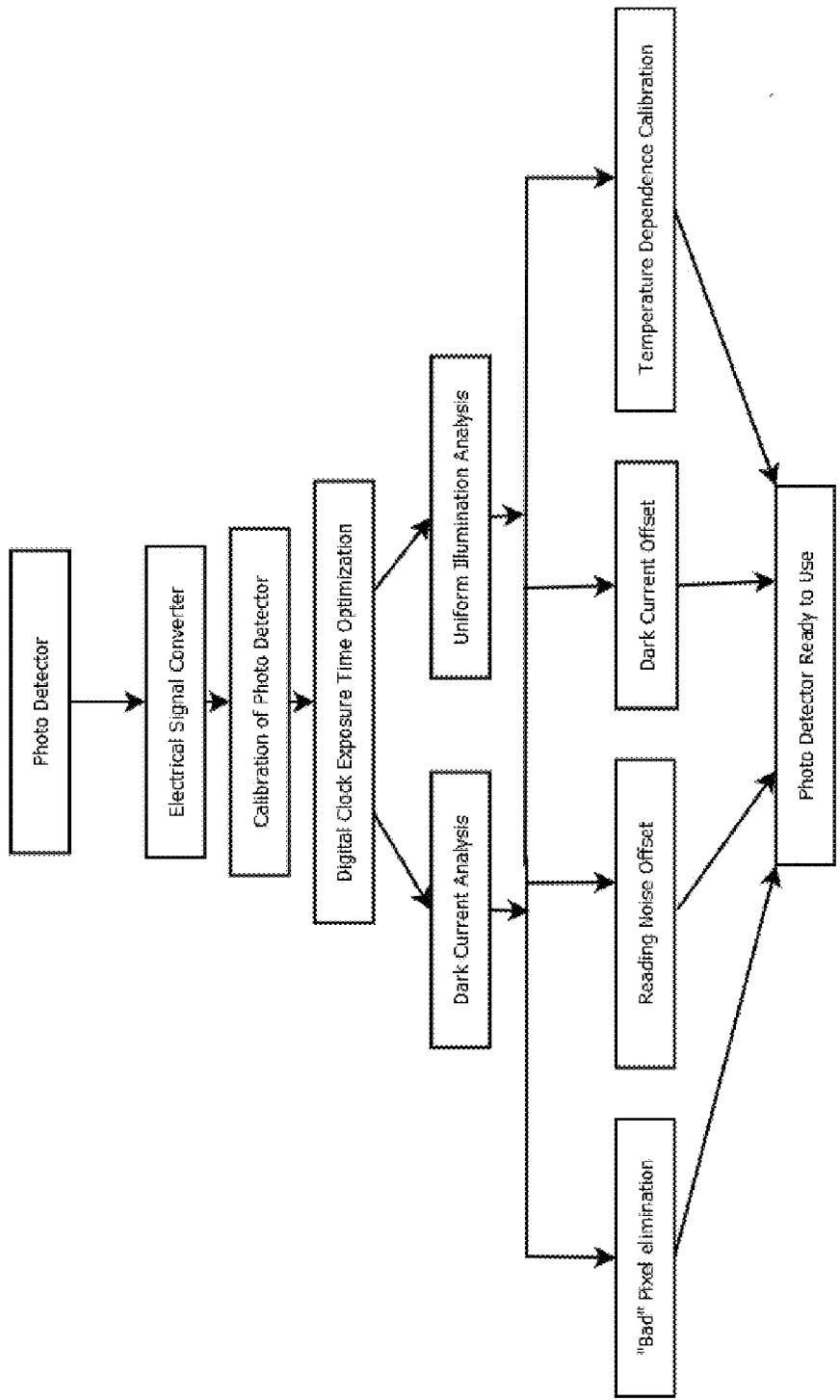
FIG. 8 shows a flow chart outlining several steps that may be used for photo detector correction. One or more of these steps may be used to obtain an algorithm for optimizing spectral data (corrected photo detector algorithm).

The location of corrected "bad" pixels, in terms of position in two dimensions defined by position (x,y), in the present described embodiment is saved to be used after data pre-processing is complete (see FIG. 8). Depending on the number of "bad" pixels in the tested electronic detector array, the detector is assigned a class of detection certainty, and such array is then used in appropriately selected applications which are not affected by such certainty. One of skill in the art may then use the class of detection certainty and determine whether the detector is suitable for a desired purpose.

Using the above methods a corrected photo detector algorithm (algorithm for optimizing spectral data) may be produced for increasing accuracy of a spectrometer system (e.g. FIG. 8). The method to produce the corrected photo detector algorithm (algorithm for optimizing of spectral data) comprises, correcting for, quality of light source, exposure time, distortion in y direction, distortion in x direction, temperature dependence, variability of pixel alignment, dark pixels, bad pixels, pixel read noise, pixel dark current noise, or a combination thereof, in a spectrometer system, to produce an algorithm for optimizing of spectral data, and measuring a sample within the spectrometer system using the algorithm for optimizing spectral data. The increase in accuracy of the spectrometer system may be determined by comparing a measurement of the sample obtained on the spectrometer system before the method of correcting is carried out, with the measurement of the sample obtained on the spectrometer system after the method of correcting is carried out. Following the step of correcting, a step of monitoring quality of the light source using one or more sample illumination monitoring channels may be performed to produce a sample illumination correction algorithm, and the sample measured within the spectrometer system using the algorithm for optimizing of spectral data (corrected photo detector algorithm) and the sample illumination correction algorithm.

Large scale spatial variation in pixel intensity is also noted and corrected for as a function of temperature and exposure time. A single broadband source may be used to make these measurements and the output signal determined. The source is coupled to a Lambertian diffuser so that light is scattered uniformly for each spatial direction and wavelength in the spectral band of interest. The Lambertian diffuser is installed in front of the PD 80 and the size of the diffuser is selected so that the PD 80 collection angle is smaller than the angular dimension of the Lambertian diffuser. The PD 80 and the Lambertian Diffuser are installed in such a way that the photo detector 80 may be rotated around the axis normal to the center of the detector and subsequent measurements are taken at the nominal position, and then rotated, in the preferred embodiment of the invention by 30 degrees steps, but other values of rotation steps may be selected as well. For each position, at least one or more measurements are taken for the broadband light source diffused by the diffuser. The mean value of the intensity (preferably with the dark current noise subtracted) of all pixels is then estimated, and all pixels which do not fall within the three standard deviations of the estimated intensity mean are flagged. In the preferred embodiment of the invention, "Normalization Matrix" is generated by the following equation:

$$NM_{(x,y)} = \frac{\mu_{(x,y)all_{measurements}}}{\mu_{all_{pixels}}}$$

Where:
NM(x,y) corresponds to the value of the Normalization Matrix at pixel at position (x,y),
$\mu_{all\_pixels}$ corresponds to the estimated mean value of all pixels for all measurements at all position, and
$\mu(x,y)_{all\_measurements}$ corresponds to the mean value of the pixel at position (x,y) as obtained for each positions.
Each position may be measured one or more times for different exposure times, for example but not limited to from about 1 to 1000 times or any amount therebetween, so that variability in position and exposure is taken into account. In other cases, fewer or even more measurements may be taken.

After initial corrections are performed on the PD 80, other sources of fluctuations, errors and distortions inherent in the spectroscopic system 200 may need to be considered. To accomplish this, the LDE 70 has to be properly attached to the PD 80. Since data for spectral analysis should contain both spectral and spatial information and mathematically, these are independent and therefore orthogonal quantities, the need for orthogonality of those two dimensions and appropriate alignment of both dimensions of the LDE 70 with the two dimensions of the PD 80 may be required.

The first alignment of the LDE 70 to the PD 80 is performed so that the direction of light dispersion is made parallel to one of the axes of the PD 80. To facilitate this process, digitized two dimensional matrix, or an image, of spectral measurements acquired on the PD 80 is displayed on a screen attached to the DPPU 100 (see FIG. 10). The image is scaled in such a way that a single pixel of the image corresponds to a multiple of pixels on the display, and both x and y directions are scaled by the same multiple. Alignment data is obtained by illuminating, as an example, with three alignment channels equidistant from each other, where all three channels are illuminated by a broadband light source which has a bandwidth preferably at least as wide as the expected wavelength dispersion of the spectrometer system. One of these alignment channels has to be placed preferably at the geometrical center of the spatial direction of the SLSC 60 and the PD 80 is rotated and translated in such a way that this center channel intersects with the geometrical center of the PD 80 and is parallel to one of the orthogonal directions of the PD 80. The focus of the image of a center alignment channel is adjusted so that the spatial width of the channel is minimized. For example, a center alignment channel which has a projected spatial dimension (height) on the PD 80 as close as possible to the sum of sizes of two pixels in that direction may be used. Heights larger or smaller are possible but will influence the error of alignment. Departure of each of the two ends of the center alignment channel in the direction of wavelength dispersion should not exceed more than one pixel from the row of pixels where the center alignment channels geometrical center falls. Two additional channels may be placed symmetrically on either side of the Center Alignment Channel and as close to the geometrical edges of the PD 80 as possible, for example but not limited to, within 5 pixels of each top (i.e. upper alignment channel) and bottom (lower alignment channel) edge of the photo detector, but other number of pixels may be chosen.

In this example, the three alignment channels are monitored on the display attached to the DPPU 100, the two dimensional matrix or image corresponding to the light dispersed by the LDE 70 as detected at a given time on the entire PD 80 array is inspected. The matrix of data acquired from the photo detector 80 is treated in Cartesian coordinates, with the "y" coordinate typically representing spatial dispersion, and "x" coordinate typically representing the spectral dispersion. The three alignment channels should therefore fall on entire rows (x-direction) on the matrix, and should have minimal width of about 2 pixels each in the y direction.

Continuing with this example, at least three vertical channels which are formed by selecting three separate columns in the y direction should therefore give three maxima of signal, each of the maxima corresponding to a position of one channel in the y direction. For each of the three columns a visual Cartesian graph can be presented to the user and/or operator. Each graph represents the distribution of intensities along the y coordinate of the PD 80 at three separate x locations in the image. For example, the x coordinate is selected to fall in the center of the x axis and two other coordinates are selected symmetrically around the center close to the edge of the detector, in the preferred embodiment within 5 pixels from each edge.

The position of each local maximum for each column is analyzed by applying a fitting function such as, for example, a Gaussian function to estimate the exact sub-pixel location of the local maximum is used, other methods such as polynomial, linear, wavelet, Savitsky-Golay and other curve fitting methods may also be used to estimate the sub-pixel location of the local maxima. Subsequently the PD 80 is rotated so that the three local maxima for each alignment channel fall symmetrically and as close as possible to the same y value. This is achieved by rotating the PD 80 to ensure that the local maxima of the central alignment channel all fall on the same y coordinate, and the upper and lower alignment channel maxima fall close to each other and are symmetrical around the central alignment channel.

If curvature of the upper and lower alignment channel is detected to exceed one pixel from the horizontal, then, a polynomial fit of the curvature may be calculated and used to produce a correction matrix for distortion in the x direction. Other methods such as Gaussian, linear, wavelet, Savitsky-Golay and other curve fitting methods may be also used.

Once the PD 80 horizontal (x-axis) axis is aligned with the dispersion direction of the LDE 70, the orientation of the SLSC 60 may require adjustment. This is achieved for example, by illuminating, the entire SLSC 60, with one or more light sources, which produce a discrete number of narrow bands of light; for example, at least three narrow bands should be detectable and spaced evenly along the anticipated spectral band of the spectroscopic system. The maxima of the three alignment narrow light bands are used to monitor and correct the orientation of the SLSC 60 in a similar fashion as was done with the three alignment channels described above. A polynomial fit of the curvature may be calculated and subsequently used to produce a correction matrix for distortion in the y direction. Other methods such as Gaussian, linear, wavelet, Savitsky-Golay and other curve fitting methods may be used.

Figure 10:
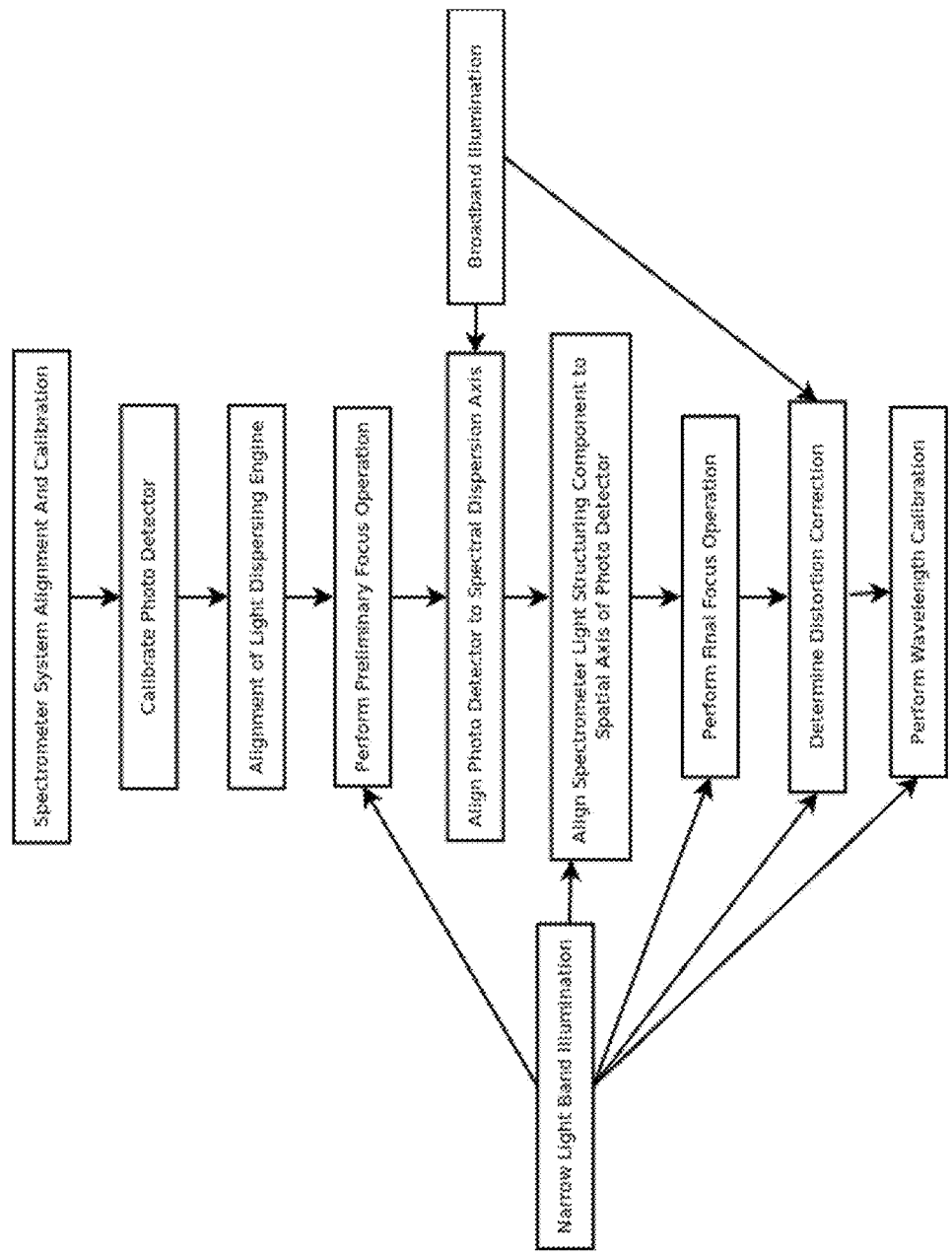
FIG. 10 shows a flow chart outlining several steps that may be used to optimize the spectrometer system including photo detector calibration, alignment, focusing and wavelength calibration.

As described above, methods other than Gaussian fit, which take into account the fact that distortions occur at sub-pixel levels can also be used (see FIG. 10). Both vertical and horizontal directions undergo this process to correct for what is typically known as "smile" effect and "keystone" effect which are caused by non-symmetrical distortion of image due to optical defects and distortions introduced by each component of the optical system. To assure the optimal transfer of the distortion correction, the correction matrices are transformed from pixel location based information into physical relation to light spectrum such as wavelength, frequency, wave number, frequency shift or others. For example, the size of correction matrix does not need to correspond to the size of the initial data matrix obtained by the Photo Detector.

Therefore, as described herein there is also provided a method of correcting, alignment of a spectrometer light structuring component with the light dispersing engine is performed to produce an LDE-PD alignment procedure, the SLSC-LDE alignment procedure, or both, and measuring the sample within the spectrometer system using the LDE-PD alignment procedure, the SLSC-LDE alignment procedure, or both. Following the step of alignment, focusing of the spectrometer light structuring component and the light dispersing engine is performed, followed by measuring the sample within the spectrometer system (FIG. 10).

In the method as described above, the LDE-PD alignment procedure may include a step of alignment of the light dispersing engine with the photo detector using:

i) alignment channels that are selected at geometric center, and near each of the edges of the photo detector to produce the LDE-PD alignment procedure.

ii) a horizontal axis of the photo detector that is aligned with a spectral dispersion of the light dispersing engine to produce the LDE-PD alignment procedure iii) the spectrometer light structuring component that is illuminated with light that produces discrete narrow bands of light, and three or more bands of the narrow bands of light are used to monitor and correct an orientation of the spectrometer light structuring component, to produce the LDE-PD alignment procedure, or iv) a combination thereof.

Additionally, the SLSC-LDE alignment procedure may include a step of alignment of the spectrometer light structuring component with the light dispersing engine using:

i) alignment channels are selected at geometric center, and near each of the edges of the photo detector to produce the SLSC-LDE alignment procedure ii) a vertical axis of the photo detector is aligned with a spatial distribution of the light dispersing engine to produce the SLSC-LDE alignment procedure iii) the spectrometer light structuring component is illuminated with light that produces discrete narrow bands of light, and three or more bands of the narrow bands of light are used to monitor and correct an orientation of the spectrometer light structuring component, to produce the SLSC-LDE alignment procedure, or iv) a combination thereof.

To ensure the appropriate functioning of the spectroscopic system after both the alignment of the LDE 70 and SLSC 60, a final focusing may be performed (see FIG. 10). To guide the focusing, for example, the three alignment channels as described above, are illuminated with the same light source (s) (for example using narrow band light), as used to align the LDE 70. The resulting image matrix on the PD 80 will show a total of nine local maxima. To ensure proper focus, all nine local maxima are analyzed for signal strength in both x and y directions. A Gaussian fit may be used to represent the distribution of intensities of each maximum in both x and y direction. The width of the Gaussian distribution at half of the maximum signal (also known as Full Width Half Maximum or FWHM) predicted by the Gaussian fit is then estimated. This measure is then minimized for all nine points in both x and y direction. Other curve fitting methods such as polynomial, linear, wavelet, Savitsky-Golay and other curve fitting methods may also be used to predict both the location and the size of each local maximum. Focusing is achieved by adjusting the optical entrance component 74 (FIG. 5), the optical output component 78, or both, of the LDE 70.

After the final focus is adjusted, both the Photo Detector alignment and the SLSC 60 alignment may be repeated. The procedure described below is then used to correct for both the horizontal and vertical distortions of the spectroscopic system.

Figure 12:
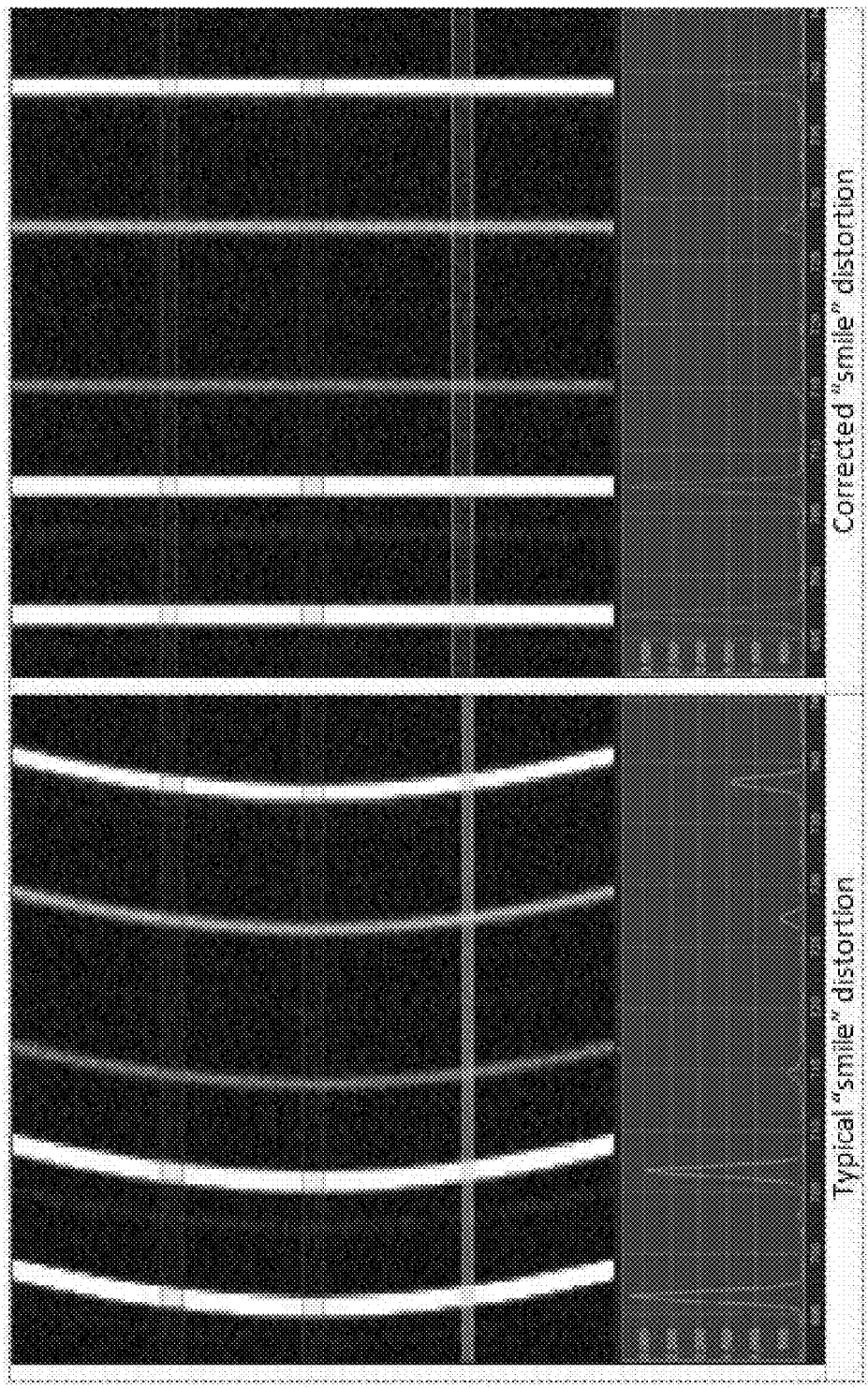
FIG. 12 shows examples of smile distortion and corrected smile distortion.
Figure 13:
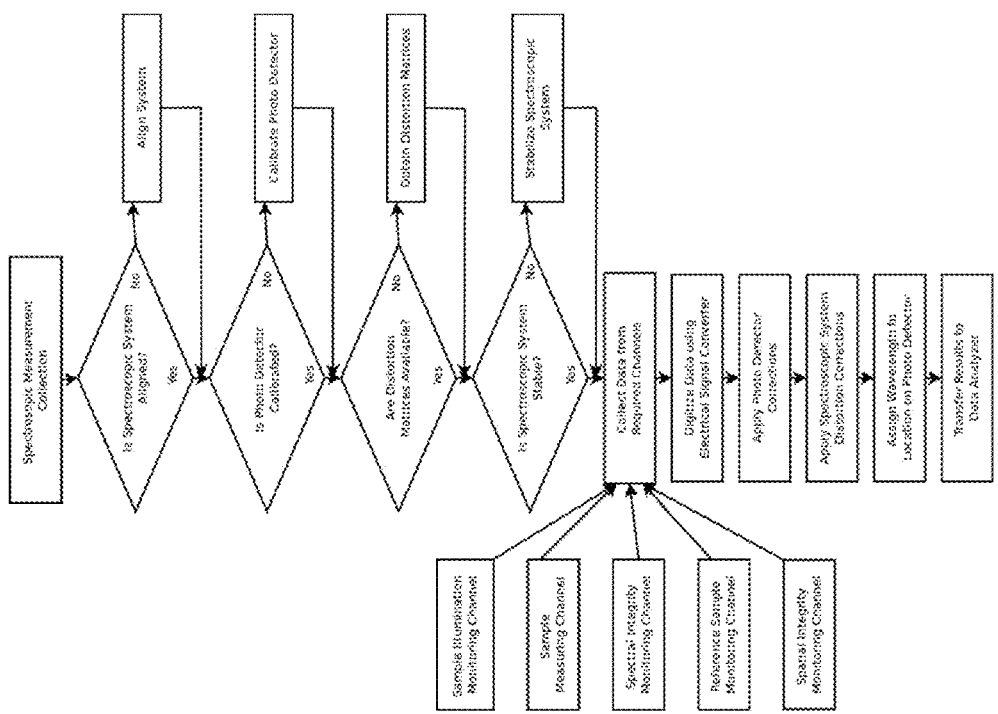
FIG. 13 shows a flow chart outlining several steps that may be used for spectrometer measurement correction.

A method for correcting the distortions commonly known as smile (along the y-axis), or keystone (along the x-axis) is provided below (see FIG. 12). This algorithm provides an interactive method of finding both the keystone and smile corrections which allow fine-tuning by a user or an operator. The algorithm implementation combines collecting three vertical rectangular regions which correspond to the narrow band alignment channels, and finding the highest peak within each row from the three regions. A different number of rectangular regions may also be used. A plot is created on the image and shown to the operator, by plotting a vector whose values list the index of the pixel related to the PD 80 for each row along the photo detector. This vector is smoothed using one or more smoothing algorithms, for example, a Savitsky-Golay algorithm is used. However, other smoothing algorithms such as Gaussian, Fourier Transform, moving average or others may also be used.

The smoothed vector is then approximated by a polynomial fit, however other types of curve fitting may be used, such as Gaussian, linear, wavelet or Savitsky-Golay. The user or operator may fine tune the curve fitting parameters so that the best possible fit may be selected. One of the user tunable parameters is the Path Threshold Value. The first step of the curve fitting algorithm creates a vector by indexing the location on the PD 80 which has the highest valued pixel (i.e. the pixel whose intensity is the highest across a row of an array of pixels from the photo detector). In the subsequent step, the information from the first step is used to "seed" the location of the next expected maximum for the next row. To find the location of the next row's highest peak, the column from the previous row's highest peak's location is selected. The neighboring x pixels, a parameter set by the user as the Path Threshold Value, are then searched for the next local maximum. The process is repeated for each row of the PD 80. Once a polynomial has been created to best fit the smoothed highest peak vectors for all three rectangular regions, it is used to create three curves across the entire height of the Photo Detector, regardless of the initial height of the three rectangular regions.

Similar process is performed in the horizontal direction, so that three rectangular regions are selected by the user in such a way that the rectangular regions contain separately local maxima of each of the three alignment channels. This creates a second set of three curves across the entire width of the PD 80.

Figure 11:
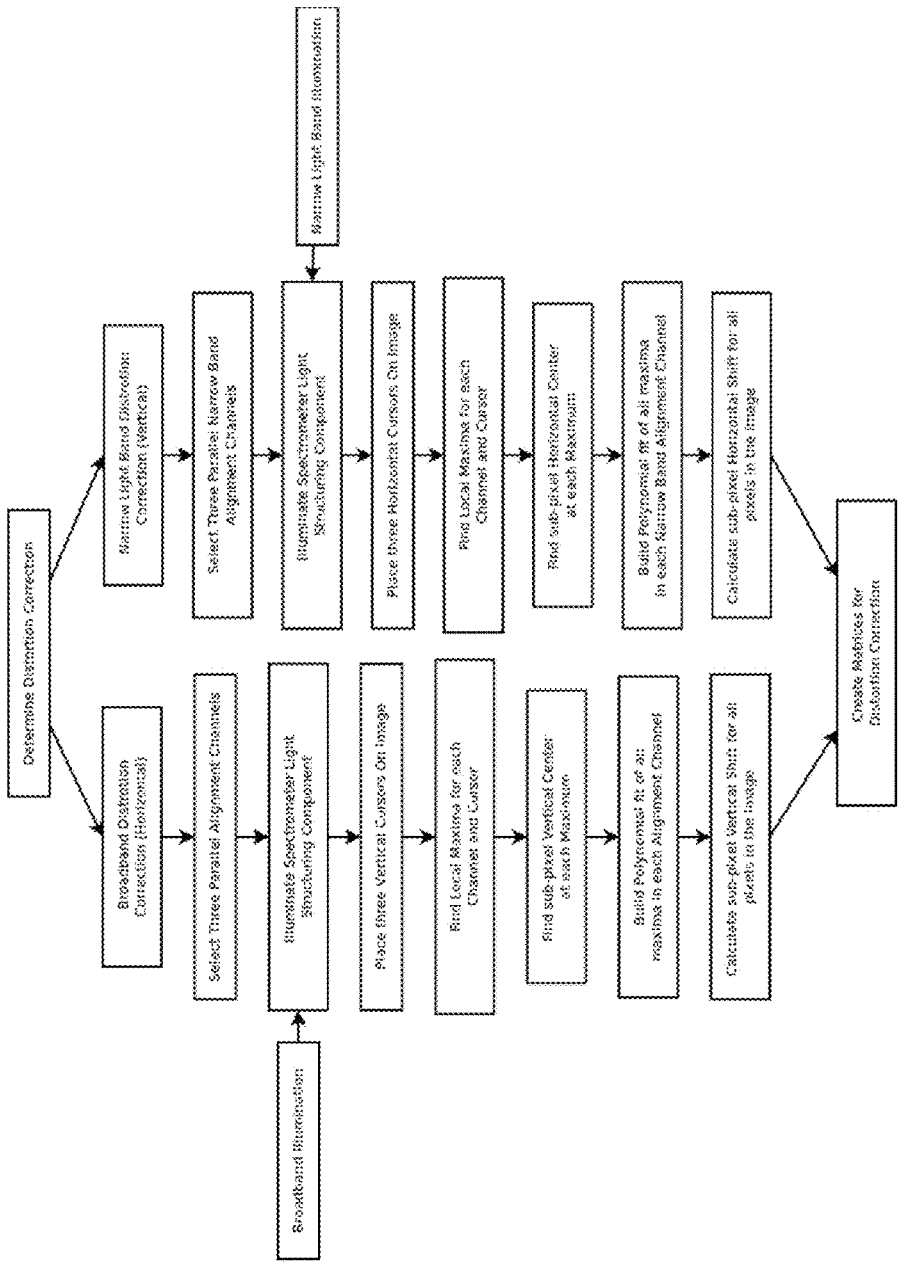
FIG. 11 shows a flowchart outlining several steps that may be used to detect and correct for distortion.

Once both curves for the width and height of the detector are determined, a digital distortion correction matrix is generated to be applied for all subsequent measurements undertaken with the same spectroscopic system (see FIG. 11). In the preferred embodiment of the invention, every spectroscopic system should have a separate correction matrix determined. However, for a series of spectroscopic systems which are built according to the same manufacturing specification, it is possible to use a single keystone and smile correction matrix, as these effects typically occur globally for an entire spectroscopic systems, with only small variations from system to system.

To generate a keystone and smile distortion correction, local maxima located on a sub-pixel level may be used. Since the actual peak of the signal may not fall on the exact center of a PD 80 pixel, two sub-component matrices may need to be generated. The first component corresponds to the integral amount that each pixel needs to be shifted to the left or right (in case of smile effect), or top or bottom (in case of keystone effect). In this case −1 corresponds to a shift of 1 pixel to the left and +1 corresponds a shift of 1 pixel to the right. The secondary component tracks a fractional portion, which the process uses to shift the intensity by that fractional amount from one pixel to its neighbor.

As seen from the description of the correction algorithm, some measured data might be shifted in such a way that it does not fall on the existing measurement matrix, and in some cases a "virtual" set of data has to be interpolated in areas where there is no information about possible intensities due to the Photo Detector configuration. In this case, the user or operator is given a choice how the Distortion Corrections are applied to the measured data. As the new correction matrix might be larger than the original detector pixel array size, a corrected image created by this new correction matrix needs to know how to fill in the new pixels. A user is allowed to select three modes:

1) Fill any new pixel with zeroes.
2) Fill with minimum intensity of image to be corrected data array
3) Fill with the estimated average of surrounding neighboring pixels. The size of the neighborhood is selected to provide the optimal information for spectral analysis.

Once the initial distortion correction matrices are created, a heuristic test may be applied to determine the effectiveness of the Distortion Corrections. Test measurements are performed for the alignment channels illuminated with the alignment narrow light bands, and a Gaussian fit for each of the local maxima is performed in both the x and y direction. The Distortion Corrections are selected when all FWHM values for both directions are minimized.

The wavelength calibration of the spectroscopic system may be performed at any point after the entire system has been aligned and focused (FIG. 10). For example, wavelength calibration is performed after the distortion corrections have been applied, so that the spectral and spatial direction of the data matrix are orthogonal to each other. However, in some cases where fast processing of data is required, the distortion corrections may be not applicable. To provide wavelength, frequency, frequency shift, wavelength shift or other physical relationship between the digital spectroscopic data and the light dispersed by the spectroscopic system, in the preferred embodiment the three alignment channels are illuminated with preferably three but possibly less or more alignment narrow light bands. The alignment narrow light bands may be formed by light sources such as spectral lamps such Argon gas, Krypton gas, Xenon gas, low pressure Mercury lamps, Neon and others; or lasers such as Helium-Neon, Cadmium and other low pressure vapor/gas lasers, and which have wavelength peaks defined to within 10% of the desired wavelength resolution from the actual theoretical peak, and the width of the alignment narrow light bands may be selected to be so that FWHM of the peak is 50% of the FWHM of the desired resolution of the spectroscopic system. Of course, other values may be used.

Figure 14:
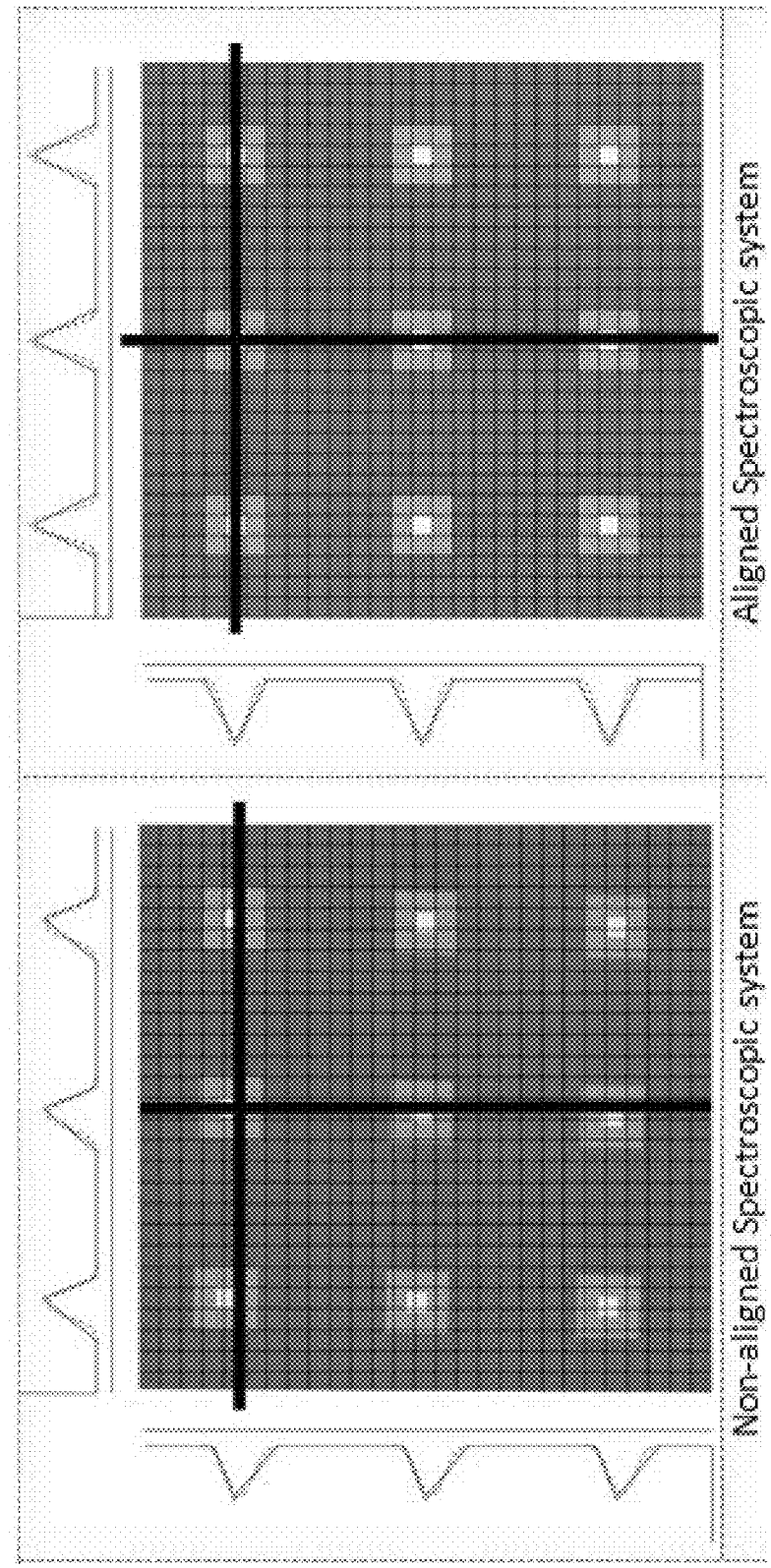
FIG. 14 shows an example of an array of a non-aligned spectroscopic system and an array of an aligned spectroscopic system.

A Gaussian fit may be applied to the local maxima created by the alignment narrow light bands for each alignment channel, other fits such as polynomial, linear, wavelet, Savitsky-Golay and other curve fitting methods may also be used. The sub-pixel center of the estimated Gaussian distribution which best fits the local maximum is then set to correspond exactly to the wavelength, frequency, frequency shift, wavelength shift or other physical description of the selected and known Alignment Narrow Light Bands. A polynomial fit may be performed for at least three such alignment narrow light band locations and the relationship between exact sub-pixel location and the wavelength information of the incident light is saved for future spectral analysis. The result following this analysis is that the light signal that impinges upon a group of pixels is subdivided, so that a portion of the light signal is allocated to each pixel within the group (see FIG. 14). Using this method, sub-pixel and fitting of curves to pixel intensity ensures proper alignment.

As shown in FIGS. 6, 8, 10, 11, and 13, one or more methods are provided for increasing accuracy of a spectrometer system is also provided that comprises, correcting for, quality of light source, exposure time, distortion in y direction, distortion in x direction, temperature dependence, variability of pixel alignment, dark pixels, bad pixels, pixel read noise, pixel dark current noise, or a combination thereof, in a spectrometer system, to produce an algorithm for optimizing of spectral data, and measuring a sample within the spectrometer system using the algorithm for optimizing spectral data.

Also described herein a spectrometer system comprising, a composite external light source in optical communication with, and in optical sequence with, a source light collector, an illumination light structuring component, a sample, a sample light collector, a spectrometer light structuring component, a light dispersing engine, and one or more photo detectors, and electrical signal converter, the electrical signal convertor in communication with a data preprocessing unit, and a data analyzer, the spectrometer system further comprising one or more of a corrected photo detector algorithm, a sample illumination correction algorithm, an LDE-PD alignment procedure, a distortion correction matrix, an algorithm for optimizing of spectral data, or a combination thereof.

The headings provided herein are not meant to be limiting of the various embodiments of the invention. Terms such as "comprises", "comprising", "comprise", "includes", "including" and "include" are not meant to be limiting. In addition, the use of the singular includes the plural, and "or" means "and/or" unless otherwise stated. Unless otherwise defined herein, all technical and scientific terms used herein have the same meaning as commonly understood by one of ordinary skill in the art.

All citations are hereby incorporated by reference.

The present invention has been described with regard to one or more embodiments. However, it will be apparent to persons skilled in the art that the scope of the claims should not be limited by the preferred embodiments set forth in the examples, but should be given the broadest interpretation consistent with the description as a whole.

What is claimed is:

1. A spectrometer system comprising:
   a single or composite light source in optical communication with, and in optical sequence with, a source light collector, an illumination light structuring component comprising optical parts, selected from: lenses; diffusers; beam splitters; polarizers; filters; light guides; or combinations thereof, a sample holder, a sample light collector, a spectrometer light structuring component comprising optical devices selected from: cylindrical lenses; non-spherical mirrors; spherical mirrors; attenuator; lenses; fiber optics; or combinations thereof, a light dispersing engine comprising optical components selected from: an optical entrance component; a light dispersing element; an optical output component; or combination thereof, one or more than one sample illumination measurement monitoring and calibration channel for guiding light onto the spectrometer light structuring component at an entrance to the light dispersing engine, the one or more measurement monitoring and calibration channel collecting a portion of light from:
   i) the external light source and passing the portion of light to the one or more than one sample illumination, measurement, monitoring and calibration channel;
   ii) the illumination light structuring component and passing the external light to the one or more than one sample illumination, measurement, monitoring and calibration channel;
   iii) the sample light collector and passing the external light to the one or more than one sample illumination, measurement, monitoring and calibration channel;
   iv) a combined light produced using a plurality of narrow spectral bands with defined spectral characteristics, a plurality of broadband bands with defined spectral characteristics, or a combination thereof, and passing the combined light onto the one or more than one sample illumination, measurement, monitoring and calibration channel;
   v) a reference sample to produce a reference light, and passing the reference light to the one or more than one sample illumination, measurement, monitoring and calibration channel;
   vi) a broadband light source to produce a broad band light, and passing the broad band light to the one or more or more than one sample illumination, measurement, monitoring and calibration channel; or
   vii) a combination thereof,
   one or more than one photo detector, and
   an electrical signal converter, the electrical signal convertor for converting the signal obtained from the one or more than one photo detector into an electric signal, the electric signal converter in communication with a data preprocessing unit comprising a computer capable of preparing electrical digital signal for analysis, and a data analyzer,
   the spectrometer system further comprising one or more of a corrected photo detector algorithm in communication with the one or more than one photo detectors, a sample illumination correction algorithm in communication with the one or more or more than one sample illumination, measurement, monitoring and calibration channel, an LDE-PD (light dispersing engine-photo detector) alignment procedure in communication with the light dispersing engine and the photo detector, an SLSC-LDE (spectrophotometer light structuring component—light dispersing engine) alignment procedure in communication with the spectrophotometer light structuring component and the light dispersing engine, a distortion correction matrix in communication with the data preprocessing unit, an algorithm for optimizing of spectral data in communication with the data preprocessing unit, or a combination thereof.

2. A method of improving quality of a signal collected during sample measurement in the spectrometer system of claim 1 comprising:
   monitoring quality of light throughout the spectrometer system, before the sample measurement, during the sample measurement, after the sample measurement, or a combination thereof, using the one or more than one sample illumination measurement monitoring and calibration channel to produce the sample illumination correction algorithm, and
   measuring a sample within the spectrometer system using the sample illumination correction algorithm,
   wherein the one or more sample illumination measurement monitoring and calibration channels collects a portion of light from:
   i) the light source and passes the portion of light to the one or more than one sample illumination measurement, monitoring and calibration channel;
   ii) the illumination light structuring component and passes the light to the one or more than one sample illumination, measurement, monitoring and calibration channel;
   iii) the sample light collector and passes the light to the one or more than one sample illumination, measurement, monitoring and calibration channel;
   iv) the combined light produced using a plurality of narrow spectral bands with defined spectral characteristics, a plurality of broadband bands with defined spectral characteristics, or a combination thereof, and passing the combined light onto the one or more than one sample illumination, measurement, monitoring and calibration channel;
   v) the reference sample to produce a reference light, and passing the reference light to the one or more than one sample illumination, measurement, monitoring and calibration channel;
   vi) the broadband light source to produce a broad band light, and passing the broad band light to the one or more or more than one sample illumination, measurement, monitoring and calibration channel; or
   vii) a combination thereof.

3. The method of claim 1, wherein a step of correcting takes place before the step of monitoring, the step of correcting comprises alignment of the spectrometer light structuring component with the light dispersing engine to produce an LDE-PD (light dispersing engine-photo detector) alignment procedure,
   alignment of the light dispersing engine with the one or more than one photo detector to produce an LDE-PD (light dispersing engine-photo detector) alignment procedure, or alignment of both the SLSC-LDE and the LDE-PD to produce the SLSC-LDE and the LDE-PD alignment procedure, and applying the alignment procedure.

4. The method of claim 3, wherein prior to the step of correcting, the light dispersing engine and photo detector are focused.

5. The method of claim 4, wherein in the step of correcting smile (y axis), keystone (x axis), or both are determined, to generate a distortion correction matrix.

6. The method of claim 5, wherein after the step of correcting a wavelength calibration is performed.

7. The method of claim 3, wherein prior to the step of correcting, focusing of the spectrometer light structuring component and the light dispersing engine is performed.

8. The method of claim 3, wherein prior to the step of correcting, the alignment of the light dispersing engine with the one or more than one photo detector comprises:
   i) selecting alignment channels at a geometric center, and near each edge of the one or more than one photo detector to produce the LDE-PD alignment procedure;
   ii) aligning a horizontal axis of the photo detector with a spectral dispersion of the light dispersing engine to produce the LDE-PD alignment procedure;
   iii) illuminating the spectrometer light structuring component with light that produces broadband light distribution matching a dispersion of the spectrometer system, and three or more alignment channels are used to monitor and correct an orientation of the one or more than one photo detector, to produce the LDE-PD alignment procedure, or
   iv) a combination thereof.

9. The method of claim 3, wherein the step of alignment the spectrometer light structuring component is aligned with the light dispersing engine, the alignment comprises:
   i) selecting alignment channels at a geometric center, and near each edge of the one or more than one photo detector to produce an SLSC-LDE (spectrometer light structuring component-light dispersing engine) alignment procedure
   ii) aligning a vertical axis of the photo detector with a spatial distribution of the light dispersing engine to produce the SLSC-LDE alignment procedure
   iii) illuminating the spectrometer light structuring component with light that produces discrete narrow bands of light, and three or more bands of the narrow bands of light are used to monitor and correct an orientation of the spectrometer light structuring component, to produce the SLSC-LDE alignment procedure, or
   iv) a combination thereof.

10. The method of claim 3, wherein in the step of correcting, smile (y axis), keystone (x axis) or both are determined, to generate a distortion correction matrix.

11. The method of claim 1, wherein prior to the step of correcting, the sample illumination correction algorithm is produced with the one or more than one photo detector removed from the spectrometer system.

12. The method of claim 1, wherein in the step of monitoring, a uniform broadband illumination or a monochromatic light source is used to produce the sample illumination correction algorithm.

13. The method of claim 12, wherein in the step of monitoring, a spatial variation in pixel intensity in a photo detector is determined and the spatial variation is used to produce an algorithm for optimizing of spectral data.

14. The method of claim 1, wherein prior to the step of correcting, dark pixels and bad pixels are identified in the one or more than one photo detector by
   illuminating the one or more than one photo detector with a uniform light for a period of time below saturation level of each pixel in the one or more than one photo detector,
   determining a signal output from each pixel, and
   identifying the pixel as the dark pixel, the bad pixel, or both, if an estimated mean of the signal output of the pixel varies by more than 3 standard deviations from a mean signal output of neighboring pixels, thereby producing an algorithm for optimizing spectral data.

15. The method of claim 1, wherein prior to the step of correcting, a pixel dark current noise is determined by measuring a dark current value at each pixel in the one or more than one photo detector under dark conditions, and a read noise value from each pixel is determined by measuring an average dark noise under different exposure times and constant temperature conditions, and producing an algorithm for optimizing spectral data.

16. The method of claim 15, wherein in the step of monitoring a dark current is used to monitor temperature of the one or more than one photo detector and to correct for the average dark noise, and used to produce the algorithm for optimizing spectral data.

17. The method of claim 15, wherein prior to the step of monitoring pixel noise resulting from temperature fluctuations is determined by varying temperature of the one or more than one photo detector while maintaining the one or more than one photo detector under dark conditions, and measuring the pixel dark current noise value and the read noise value from each pixel to produce the algorithm for optimizing spectral data.

18. The method of claim 17, wherein prior to the step of monitoring, the pixel noise is corrected for the read noise value by maintaining the one or more than one photo detector under constant temperature and constant illumination, while varying an intensity of light, and an exposure time, and measuring the read noise value from each pixel to produce the algorithm for optimizing spectral data.

19. The method of claim 18, wherein the step of monitoring, an effect of one or more electromagnetic fields within the spectrometer system on the read noise is determined by periodic measurement of the read noise during use of the spectrometer system.

20. The method of claim 1, wherein in the step of monitoring the quality of the light source, an output of the one or more than one measurement, monitoring and calibration channel is formed into a single line, a single curved line, two or more parallel lines, two or more curved lines, two or more non-parallel lines, a structured spatial distribution, a two dimensional array and directed onto the light dispersing engine, to produce the channel correction algorithm.

21. The method of claim 1, wherein in the step of monitoring, a uniform broadband illumination, or a monochromatic light source, is used to illuminate a reference sample to produce the sample illumination correction algorithm.

22. The method of claim 21, wherein in the step of correcting, the one or more than one alignment channels are illuminated with the light source that produces one or more narrow bands of light, one or more maximum signals of the narrow bands are identified on the photo detector, and the signal is focused by adjusting an optical entrance component of the light dispersing engine, an optical output component of the light dispersing engine, or both.

* * * * *